United States Patent [19]

Loskorn et al.

[11] Patent Number: 4,630,232
[45] Date of Patent: Dec. 16, 1986

[54] READ WRITE SYSTEM FOR MULTIPLE LINE ADAPTER ORGANIZATION

[75] Inventors: Richard A. Loskorn, Dana Point; Lyle O. Jevons, Jr., Mission Viejo, both of Calif.

[73] Assignee: Burroughs Corporation, Detroit, Mich.

[21] Appl. No.: 594,441

[22] Filed: Mar. 30, 1984

Related U.S. Application Data

[63] Continuation-in-part of Ser. No. 386,410, Jun. 8, 1982, abandoned.

[51] Int. Cl.$^4$ .............................................. G06F 13/00
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 4,025,906 | 5/1977 | Riikonen | 364/200 |
| 4,103,328 | 7/1978 | Dalmasso | 364/200 |
| 4,200,930 | 4/1980 | Rawlings et al. | 364/200 |
| 4,254,462 | 3/1981 | Raymond et al. | 364/200 |
| 4,281,315 | 7/1981 | Bauer et al. | 364/200 X |
| 4,293,909 | 10/1981 | Catiller et al. | 364/200 |
| 4,325,119 | 4/1982 | Grandmaison et al. | 364/200 |
| 4,365,293 | 12/1982 | Holtz | 364/200 |

OTHER PUBLICATIONS

"Architecture of a Universal Communications Processor", Steele & Mattson, Computer Design, 1973, pp. 63-68.

Primary Examiner—Eddie P. Chan
Attorney, Agent, or Firm—Alfred W. Kozak; Nathan Cass; Kevin R. Peterson

[57] ABSTRACT

An I/O subsystem, controlled by a microprocessor, includes a plurality of line adapters, each of which provides data-comm lines to remote terminal units. Each line adapter has a USART control unit and a timer unit having internal registers which can be written-into or read-out from by said microprocessor which uses means to select a particular line adapter to access a particular register in the USART unit or the timer unit.

3 Claims, 17 Drawing Figures

QUAD LINE ADAPTER - BYTE ORIENTED

DLI/LA (SINGLE) DATA BUS STRUCTURE

QUAD LINE ADAPTER - BYTE ORIENTED.

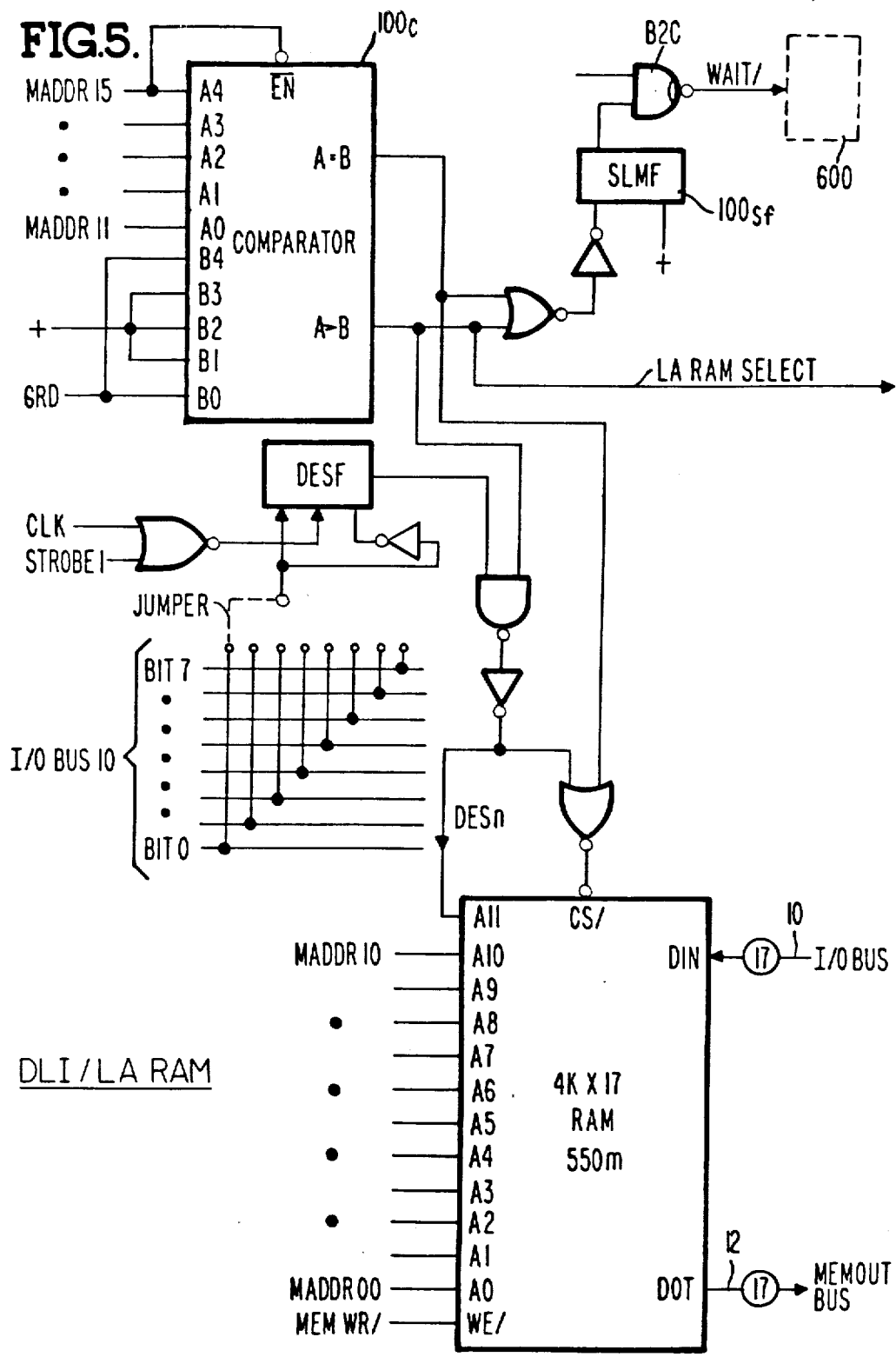

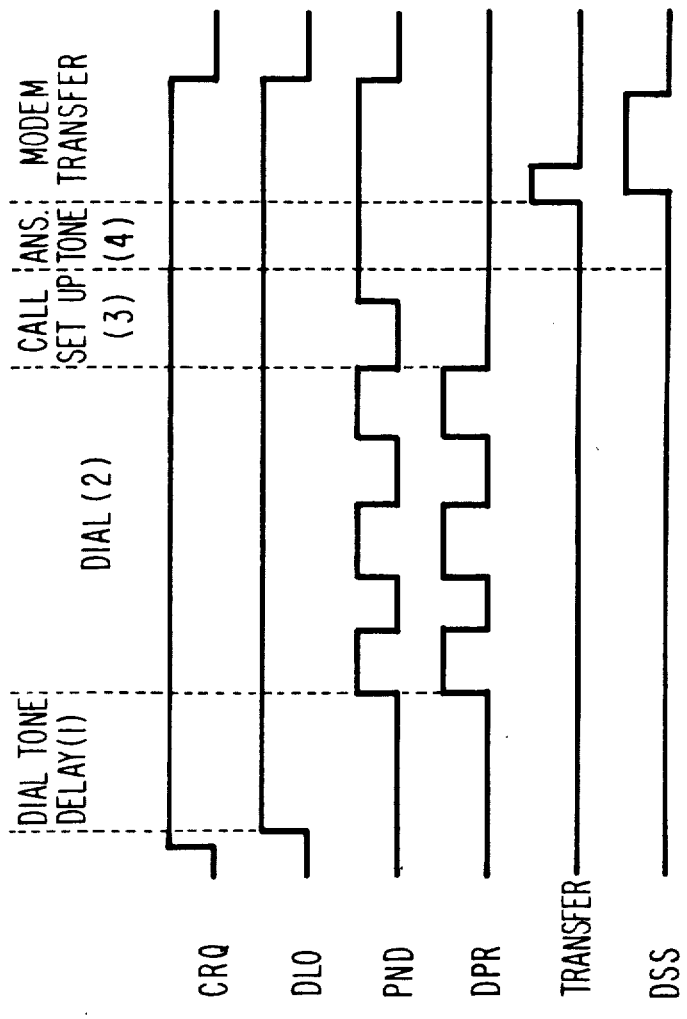
FIG. 7. DIALING SEQUENCE FOR THE TYPE 801 AUTOMATIC CALLING UNIT.

| FIG.9A | FIG.9B |

READ WRITE SYSTEM FOR MULTIPLE LINE ADAPTER ORGANIZATION

This application is a continuation-in-part of application Ser. No. 386,410, filed June 8, 1982, now abandoned.

FIELD OF THE INVENTION

This disclosure relates to data-comm systems using multiple line adapters, each of which handles a separate communication line to a data terminal.

CROSS REFERENCES TO RELATED APPLICATIONS

This disclosure is also related to two applications entitled "Byte Oriented Line Adapter System" and "Bit Oriented Line Adapter System", inventors Richard A. Loskorn, Philip D. Biehl and Robert D. Catiller, and filed Mar. 5, 1982, as U.S. Ser. Nos. 355,135 now U.S. Pat. No. 4,514,824 and 355,134 now U.S. Pat. No. 4,455,622.

Incorporated by reference are several patents which form a background and explanation for microprocessors used with the line adapters of this disclosure. These patents, which are included by reference, are:

U.S. Pat. No. 4,293,909 entitled "Digital System For Data Transfer Using Universal Input-Output Microprocessor", U.S. Pat. No. 4,291,372 entitled "Microprocessor System with Specialized Instruction Format", U.S. Pat. No. 4,292,667 entitled "Microprocessor System Facilitating Repetition of Instructions".

U.S. Pat. No. 4,189,769 entitled "Input-Output Subsystem for Digital Data Processing System".

SUMMARY OF THE INVENTION

A read and write system for reading data from or writing data into selected registers of each of a plurality of line adapters. A multiplicity of line adapters form an I/O subsystem controlled by a microprocessor. Each line adapter is connected to a remote data terminal for data transmission, and selection means is provided to select a particular line adapter and any one of its internal registers residing in its USART unit and timer unit.

After selection of a particular line adapter which is "designated" by the microprocessor's turning on a "Designate" flip-flop associated with the selected line adapter, the microprocessor loads a register address into one of its output control registers (38, FIG. 3) via a PUT OP instruction. Another PUT OP instruction is initiated by the microprocessor to load a pointer (USART chip select) into another output control register (37, FIG. 3). Then using a PUT and a GET operator, a read-enable signal permits data transfer from the selected register of a USART to an I/O bus for input to the microprocessor, after which the chip select signal is removed.

In a similar fashion, a selected register in the timer unit of the selected line adapter can be "read" from.

Then, likewise, control information data can be "written into" a selected register of the USART unit or Timer unit of the selected line adapter for controlling operation of the line adapter with its remote data terminal.

BRIEF DESCRIPTION OF THE DRAWINGS

FIG. 5 is a drawing of logic circuitry used to select memory or other components for a given line adapter.

FIG. 7 is a timing diagram for dialing an Automatic Calling Unit (ACU).

DESCRIPTION OF PREFERRED EMBODIMENT

The line adapter selection means of the present disclosure is designed to be used as part of a line support processor (also often called a frame recognition-data link processor) as part of a data comm I/O subsystem.

Figure 1:
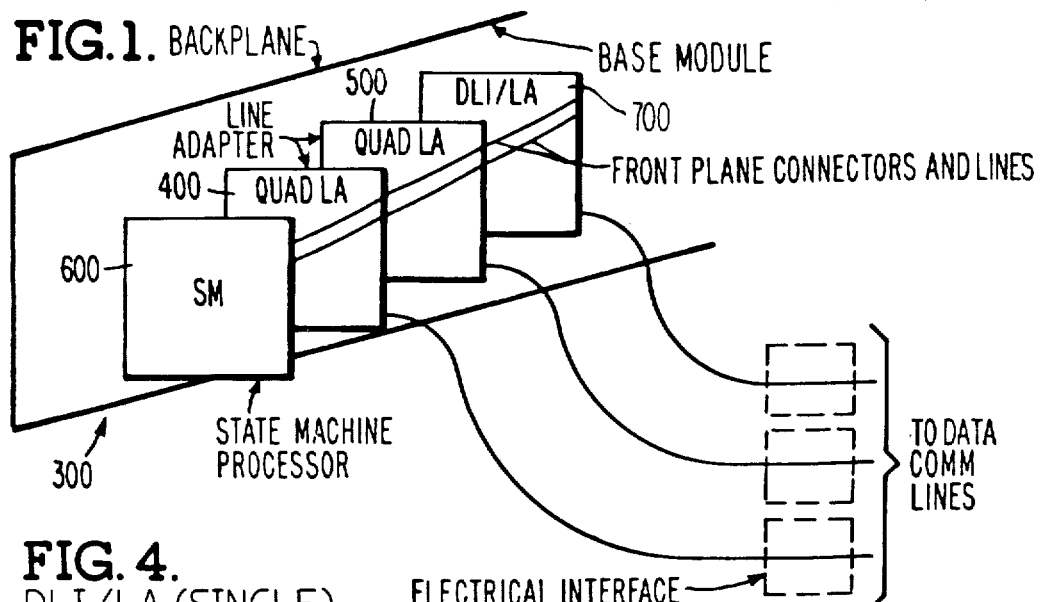
FIG. 1 is a schematic drawing of a data-comm I/O subsystem with slide-in cards fitting into a base module backplane and having frontplane connections therebetween.

FIG. 1 shows such a data comm I/O subsystem wherein a state machine processor card 600 works in coordination with various types of line adapters. A single line adapter card 700 may be used as well as Quad line adapters such as that shown in cards 400 and 500. These Quad line adapters constitute units of four addressable line adapters, and each line adapter can handle a single data communications line terminal through an electric interface.

Figure 4:
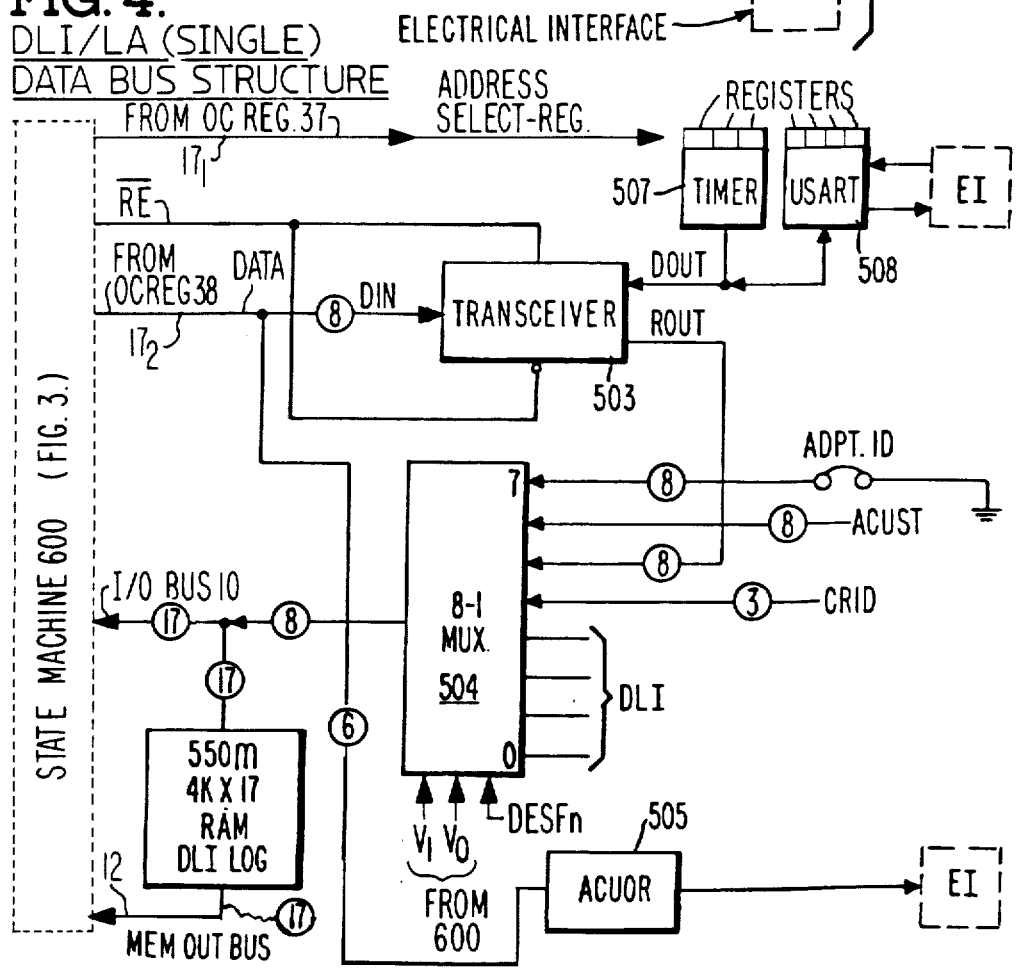
FIG. 4 is a block diagram of a single byte-oriented line adapter.

FIG. 4 shows a block diagram of a "Single" byte oriented line adapter system. A remote data set or data input-output terminal may be connected to input-output circuit means which includes timer 507 and USART 508. This input-output circuit connects to a transceiver bus-controller 503 which can route the data to a multiplexor 504 for conveyance along I/O bus 10 to the state machine processor 600 or into a RAM buffer $550_m$. Data in the state machine processor can be routed from the state machine's output control register 38 (FIG. 3) along bus $17_2$ into the transceiver bus controller 503 for transmission to the input-output circuit means. The multiplexor 504 receives control signals from the data link interface unit 700 of FIG. 1 in addition to other control signals which identify units within the line adapter system. Also provided is an automatic calling unit output register 505 which can receive signals useful for dialing remote terminals on telephone lines.

Figure 2:
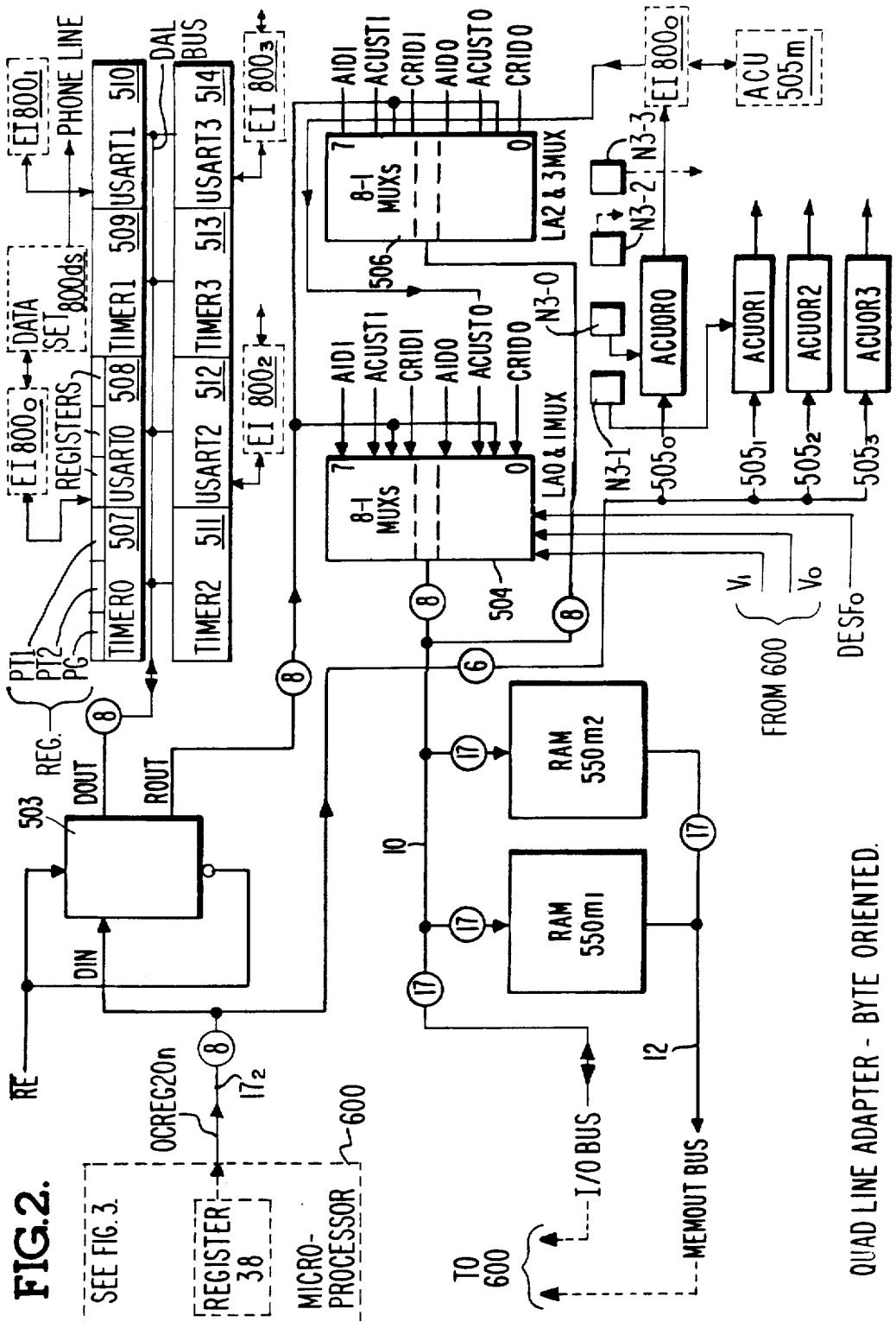
FIG. 2 is a block diagram of a multiple line adapter card.

FIG. 2 is a block diagram of a "Quad" Line Adapter used for byte oriented protocol operations. The input-output circuit means which connect to remote terminals is composed of four basic units such as 507, 508 (timer 0 and USART 0). Likewise, input-output service to a remote terminal is provided by timer 509 and USART 1 designated 510. Likewise, units 511, 512 constitute an operating unit for another remote terminal as do units 513 and 514 for yet another remote terminal.

As discussed under FIG. 4, the Line Adapter uses a transceiver bus controller 503 and a set of multiplexors 504 and 506. It should be noted that the multiplexors such as 504 and 506 are in essence "dual" operating multiplexor sets in that they receive control signals from two different input-output units. Multiplexor 504 receives input signals from Line Adapters 0 and 1 while multiplexor 506 receives input signals from Line Adapters 2 and 3 of FIG. 2.

Corresponding to the Automatic Calling Unit Output Register of FIG. 4, the Quad Line Adapter of FIG. 2 uses 4 such ACU output registers. Also in the Quad Line Adapter (FIG. 2) there is provided an extra set of RAM buffer memories designated $550_{m1}$ and $550_{m2}$.

Figure 3:
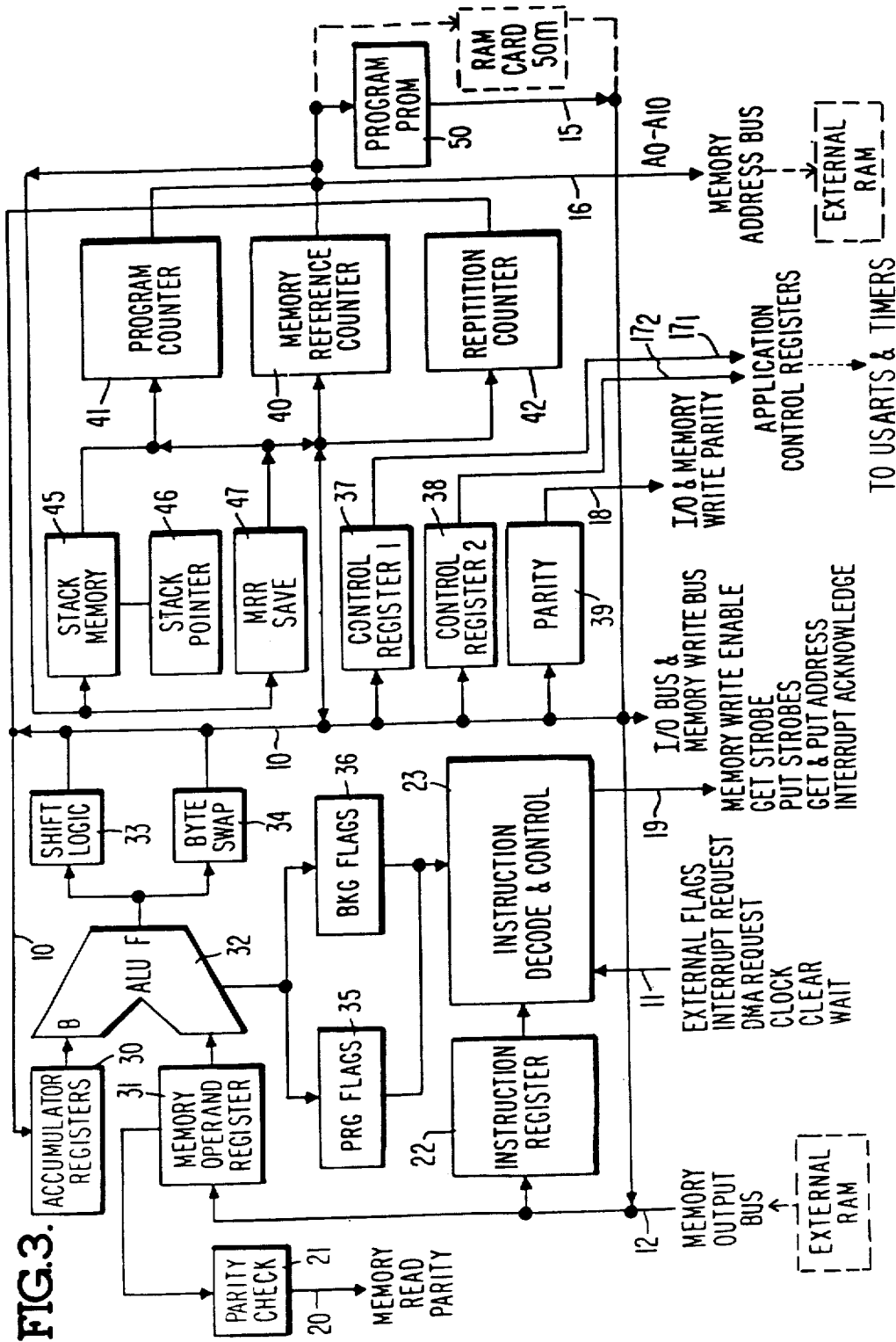
FIG. 3 is a block diagram of the state machine processor which controls operations of the line adapter.

FIG. 3 is a block diagram of the State Machine Microprocessor which is used to control the single line adapter or multiple configurations of line adapters. The State Machine Processor (sometimes designated as UIO State Machine) resides on a circuit board of chips which can be inserted as a slide-in card into the base module (FIG. 1) where it connects to the backplane. The State Machine connects to the application dependent logic through the frontplane connectors as seen in FIG. 1.

A detailed description of the elements and use of the UIO State Machine has been the subject of several prior patents which are included herein by reference. These patents are:

U.S. Pat. No. 4,293,909 entitled "Digital System For Data Transfer Using Universal Input-Output Microprocessor", inventors Robert D. Catiller and Brian K. Forbes.

U.S. Pat. No. 4,291,372 entitled "Microprocessor System with Specialized Instruction Format", inventors Brian K. Forbes and Robert D. Catiller.

U.S. Pat. No. 4,292,667 entitled "Microprocessor System Facilitating Repetition of Instructions", inventors Robert D. Catiller and Brian K. Forbes.

The use of a host computer working in conjunction with an I/O subsystem which uses peculiar commands called I/O descriptors, data link descriptors, and result descriptors is shown in U.S. Pat. No. 4,189,769, Feb. 19, 1980, to Darwen J. Cook and Donald A. Millers, II, and entitled "Input-Output Subsystem for Digital Data Processing System" and this patent is also included herein by reference.

FIG. 5 is a diagram of certain logic on the DLI/LA card 700 which is used to select or "Designate" the RAM buffer memory of the single Line Adapter card or a selected memory of a specific one of the four line adapter memories on the Quad line adapter card. Shown as RAM storage means $550_m$ in FIG. 5 is the particular memory used for the single Line Adapter. However, in the "multiple" Line Adapter situation, each Line Adapter has a similar selection system for selecting the particular memory associated with that Line Adapter, as seen in FIG. 2 with local RAM memory $550_{m1}$, $550_{m2}$.

In FIG. 5, address lines from the State Machine Processor (MADDRnn) connect to a comparator $100_c$ and also to the RAM buffer $550_m$. A chip select signal Cs/ is activated to the buffer memory $550_m$ by means of logic signals from the comparator $100_c$ and the Designate Flip-Flop (DESF). A unique jumper bit provides input to the Designate Flip-Flop from the I/O bus 10 in order to particularly identify any given selected buffer memory in the system. The particular bit line of the I/O bus 10, which is to be chosen, is set by the State Machine Microprocessor 600 of FIG. 3.

"BYTE ORIENTED" LINE ADAPTER

A functional section of the Line Support Processor (also called the Frame Recognition-Data Link Processor and/or Line Support Processor-DLP) is the Line Adapter called the "Byte Oriented Line Adapter". This is sometimes also called a "Character Oriented Line Adapter".

The data comm Line Adapter is basically a device which interfaces on one end to a data communication line "electrical interface", and on the other end interfaces to a processor which has been designated as the UIO State Machine 600 (UIOSM). The primary function of the Line Adapter is to serialize "bit" information to/from "byte" information, to provide timing, to generate service requests, to supply a RAM memory, to provide automatic calling interfacing and to provide connection to level changers which will match the data communication lines. The Byte-Oriented Line Adapter is also built in two basic configurations designated as (i) Quad Line Adapter and (ii) the Single Line Adapter. The Single Line Adapter is part of the Line Support Processor and the Single Line Adapter shares the same board with the Data Link Interface (DLI) circuitry. The Line Adapter is required regardless of the quantity of lines controlled by the Line Support Processor. The Quad Line Adapter contains essentially four (4) Line Adapters on one board. These boards are typical 10 inch by 13 inch boards which plug into the backplane of the Base Connection Module (FIG. 1).

As seen in FIG. 1 each of the Line Adapter cards 400, 500 connect both to the State Machine Processor 600 and to the DLI/LA 700 (Data Link Interface-Single Line Adapter).

As seen in FIGS. 2 and 4, connection to the data communications line is through an electrical interface (EI) which connects to the Line Adapter. There are various types of electrical interface boards which exist and which may be mounted in different combinations on the Quad Line Adapters. Thus, depending on the electrical characteristics of the data comm line, the only change required is that of the electrical interface, while the Line Adapter remains as is.

From one to 16 Line Adapters may variously be addressed by the State Machine Processor 600; thus, each Line Adapter is jumpered uniquely in order to identify its address. The Line Adapter must be "designated" for the State Machine Processor to communicate with it. Several addressable components are contained on a Line Adapter which the State Machine Processor may communicate with, in the form of Write/Read data or "Status" or "Control" signals.

The addressable components of the Byte Oriented Line Adapter are:

(i) USART (508,510, 512, 514, FIG. 2)

(ii) Timer (507,509, 511, 513, FIG. 2)

(iii) Auto Call Output Registers ($505_0$, $505_1$, $505_2$, $505_3$).

(iv) Auto Call Status for each ACU ($ACU_0$, $ACU_1$, $ACU_2$, $ACU_3$).

(v) Component Requestors (units within USART's and Timers)

(vi) Memory (RAM) (single card LA RAM or Quad Card LA RAM).

The USART (Universal Synchronous/Asynchronous Receiver/Transmitter) accepts data "bytes" from the State Machine Processor 600 and converts them into serial "bits" for transmission; it also receives serial bit data and converts this to parallel data bytes. The USART device is initialized by writing into its two internal control registers which specify the manner in which it operates.

A typical USART preferred for this purpose is manufactured by Western Digital Corporation, 3128 Redhill Avenue, Newport Beach, Calif. 92663, and is designated as UC1671 and described in a Technical Manual dated August 1978 as UC1671 Asynchronous/Synchronous Receiver/Transmitter.

Various bits of the internal control registers of this USART unit specify such things as: synchronous/asynchronous mode; bits per character; parity; baud rate; transparent mode; Echo mode. The Timer used on the Byte Oriented Line Adapter serves two basic functions: (i) as program timers and (ii) as baud rate generators for asynchronous operation. Three independent internal timers are contained in each chip, two of which are used by the software for timing purposes relative to the line operations for "transmit" and for "receive" operation. The third timer is used to generate a square wave clock which is used by the USART for asynchronous operation. Each timer is initialized independently, which indicates the "mode" in which it is to operate. The two program timers are capable of activating a Flag signal to the State Machine Processor 600 when a pre-determined timing value has been reached.

The Auto Call Output Register, FIG. 2, (ACUOR 505) is a register which is loaded by the State Machine Processor with "dial digit" and control information. The output of this register drives level-changer chips which convert the logic signals to EIA RS-232 voltages. These signals drive an automatic calling unit (ACU) such as a Bell 801, which provides dial-out capabilities.

Auto Call Status (ACUST0, ACUST1, ACUST3, of FIG. 2) is a means of providing the condition or state of input lines from the automatic calling unit (ACU) to the State Machine Processor 600. Lines from the ACU are received by level-changer chips which convert the EIA voltages to TTL logic levels. These logic levels may be read by the State Machine Processor to determine the present status.

The Component Requestors from a Line Adapter are as follows: (i) USART; (ii) Program Timer 1; (iii) Program Timer 2.

These three components are capable of generating "service requests" independently of each other at unique times relative to its initialization. The "service requests" activate a flag signal to the State Machine Processor which indicates that Line Adapters require servicing. After the State Machine determines which Line Adapters are requesting service, it must then determine which "component" on a particular Line Adapter is requesting service.

Memory on the Line Adapter consists of $2,048 \times 17$-bit words of RAM for each line. Therefore, each Quad Line Adapter card actually contains $8,192 \times 17$-bit words of RAM. The Single Line Adapter card (FIG. 4) contains 4,096 words of RAM $550_m$, one half for the data comm line and the remainder for DLI 700. The RAM is used by the software for transmit/receive message buffering, for tables and for statements associated with the line operation.

BYTE ORIENTED LINE ADAPTER—OPERATION

Designate:

When the State Machine Processor 600 executes code relative to an addressable component on a Line Adapter (LA), the LA must be "designated". Each Line Adapter (as in FIG. 5) contains a flip-flop, whose input is jumpered to a specific bit of the I/O bus, FIG. 5. In order to "designate" a Line Adapter, the State Machine Processor must execute a PUT OP with Strobe No. 1 and the corresponding bit of the I/O bus must be equal to 1. Executing the same OP with the I/O bus bit equal to 0 will reset the Designate Flip-Flop shown typically as "DESF" on FIG. 5.

Flag Operation:

The various components of a Line Adapter are capable of producing "service requests". These "service requests" are basically ORed together in order to drive a common FLAG line for all Line Adapters. A signal line, FLAG 2/, when being low active, notifies the State Machine Processor 600 that some Line Adapters are requesting service. The State Machine Processor can determine which ine Adapters are requesting service by executing a GET OP with the variant field V-FLD (4:5) equal to 00001. The Line Adapter does not need to be "designated" for execution of this OP.

"Register address" (REGADRn) signals in the Line Adapters are the five V-FLD signals from the State Machine Processor.

Figure 6:
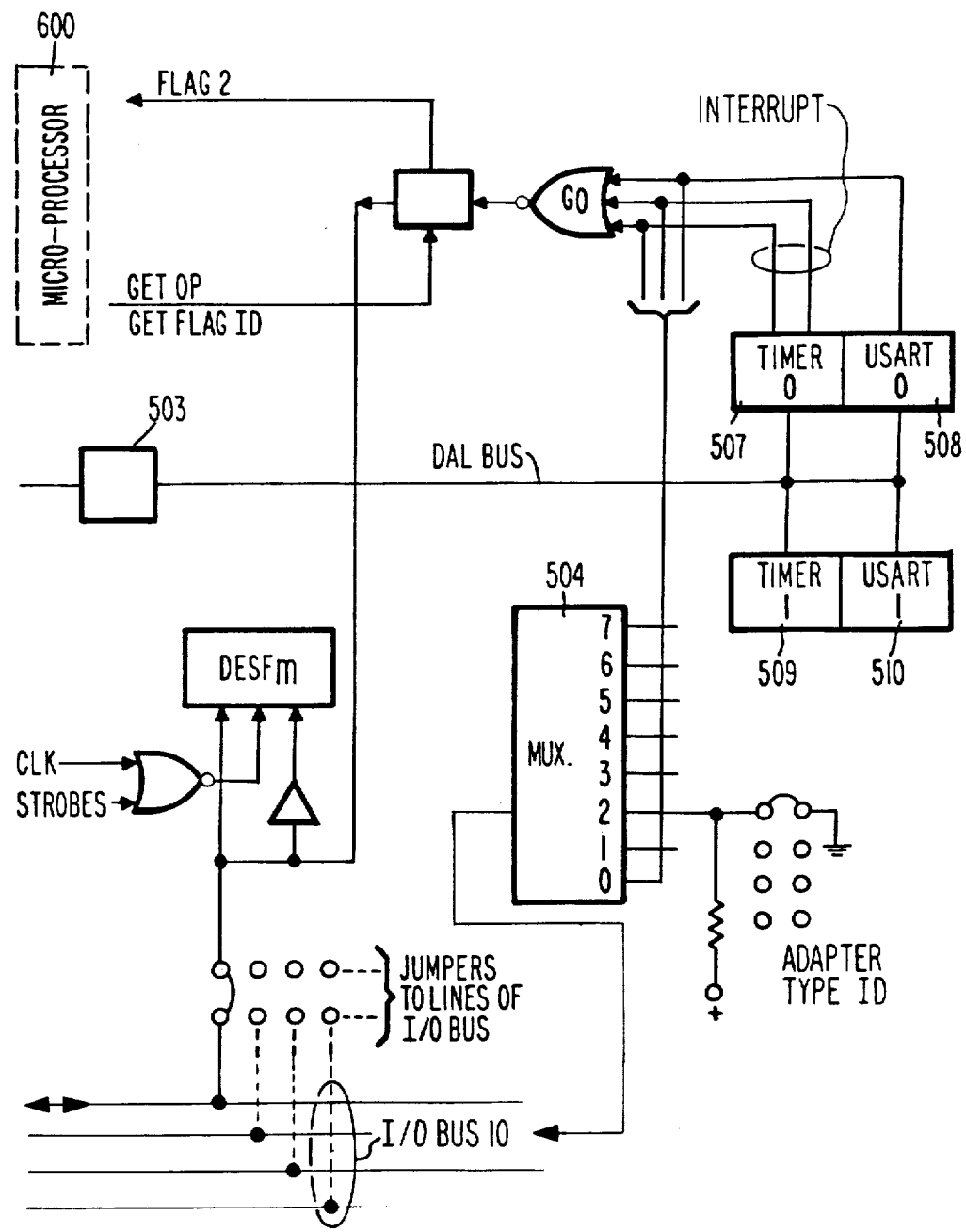
FIG. 6 is a schematic drawing of the circuitry for identifying a line adapter or its sub-components.

Flag operation, with reference to FIG. 6, is accomplished by the FLAG 2/ line which when low active notifies the State Machine Processor that a Line Adapter is requesting service. For example in FIG. 6, if Line Adapter 0 requests service then NOR Gate $G_0$ is activated to provide a signal (low) on the FLAG 2/ line.

Upon receiving this signal, the State Machine Processor will initiate a GET OP on the GET FLAG ID line. This will send the output signal of Gate $G_0$ to a particular line of the I/O bus (which is dedicated to a particular one of the Line Adapters) which, when read by the State Machine will identify the particular Line Adapter involved, in this case, the Line Adapter 0.

Similarly each line Adapter as 1, 2, 3, etc. will have a Gate $G_1$, $G_2$ or $G_3$ to activate the FLAG 2/ line and cause the State Machine to "read" the particular "jumper" connection to the line on the I/O bus associated with that Line Adapter.

Data Bus Structures:

With the exception of the RAM (FIG. 5), memory $550_{m1, m2}$, all data sent to addressable components on the Line Adapter originate from the "Second" Output Control Register 38 (FIG. 3) in the State Machine Processor With the exception of RAM, all data "read" by the State Machine Processor from addressable components on the line Adapter will go to the State Machine Processor via the I/O bus 10.

With reference to FIG. 4 (DLI/LA data bus structure), the Single Line Adapter data bus structure is shown.

As seen in FIG. 4, the Second Output Control Register 38 (FIG. 3) lines $17_2$ (OCREG 20n) connect directly to the inputs of the Auto Call Unit Output Register 505 (ACUOR); and they also connect directly to the Transceiver Bus Controller chip 503 which provides bidirectional bus drivers.

The Auto Call Unit Output Register 505 is a six bit "D" type flip-flop register (DR6n). When the clock input is enabled, data from the Second Output Register 38 will be strobed into ACUOR 505.

Data sent to both the Timer 507 and to the USART 508, FIG. 4, originate from the Second Output Register 38 in the State Machine Processor (FIG. 3) and is sent through the Transceiver bus controller 503; then is sent to the addressed component. The data lines for the Timer component are HI active and for the USART component they are LO active. Being as both components share the same data bus, data to one of the components must be inverted. The Timer 507 is used to receive the "inverted" data, that is, $1=0$ and $0=1$, while the USART 508 receives the conventional format. Thus, a "one" bit from the Second Output Register 38 in the State Machine Processor (FIG. 3) will appear as a "one" bit to the USART (active low) and as a "zero" bit to the Timer. The Transceiver bus controller 503, although being a three-state device, is not used in its third or high impedance state. It is used for driving either DIN (data in) to DOUT (data out) or DOUT to ROUT depending on the state of the RE signal which originates from bit 4 of the First Output Control Register 37 in the State Machine Processor. When bit 4 of Register 37 is On, the signal RE is positive and "enables" the DIN to DOUT direction through the Transceiver bus controller 503.

Reading of information (except RAM read) from a Line Adapter is performed by decoded GET OPs, and the read information is available on the least significant 8 bits of the I/O bus 10. The 8-1 multiplexor 504 is the source of the read information.

On the "Single" Line Adapter (FIG. 4) four of the eight inputs to MUX 504 are used by the Line Adapter and the remainder are used by the Data Line Interface (DLI). The multiplexors (MUX's) are chip selected (low level) during a GET OP when the V-FLD (3:2) is equal to "11" and either V-FLD (4:1) equals 0 (DLI GET) or the Designate Flip-Flop (DESF) is ON (LA GET).

On the "Quad" Line Adapter cards (FIG. 2) there are 16 multiplexors, each having an eight-one ratio. There are 8 multiplexors for each "pair" of Line Adapters.

As seen in FIG. 4, the eight input lines to MUX 504 are divided in half such that four lines connect to the DLI (Data Link Interface), and four lines connect to the Line Adapter. Similarly in FIG. 2, in the Quad Line Adapter, the eight input lines of each group of eight multiplexors is divided in half, similar to the Single Line Adapter, thereby making four groups. Any group of four input lines is selected by its "Designate Flip-Flop" (DESF, FIG. 5) being ON. The selection of any one of four lines of any such group is performed by the two least significant bits of the V-FLD of a GET OP.

Data to be "written into" RAM memory in a Line Adapter (FIGS. 2,5) is sent via the I/O bus 10 in 16 bits plus parity format. The data "read from" RAM memory in a Line Adapter is placed on the MEMOUT bus 12 with 16 bits plus parity.

Component Addressing:

As seen in FIG. 4, the outputs of components to be "read" are routed to the inputs of the 8-1 multiplexor 504 which then drive the I/O bus 10. There are five components on a Line Adapter which may be "read" by the State Machine Processor, these are:

Component Requestor ID (CRID)
USART (508)
Timer (507)
Automatic Calling Unit Status (ACUST)
Adapter Type ID (ADPT.ID)

Although these five components on a Line Adapter may be read, the USART 508 and the Timer 507 share the same input line (ROUT) to the multiplexors. Selection of one of the four inputs in either group (of inputs to the 8-1 multiplexors) is performed by the two least significant bits of the V-FLD of the GET OP. V-FLD (3:4) equals 11XX and selection of one of the four inputs is determined as shown in Table Y-1.

TABLE Y-1

| V1(x) | V0(x) | Component Addressed |
|---|---|---|
| 0 | 0 | Component Requestor ID |
| 0 | 1 | USART/Timer |
| 1 | 0 | ACU Status |
| 1 | 1 | Adapter Type ID (Identification) |

In FIG. 4 the Single Line Adapter multiplexor 504 allows three components on a Line Adapter to be written into (not including RAM). These are: Automatic Calling Unit Output Register 505 (ACUOR), the USART 508 and the Timer 507. The addressing of these three components occurs in two distinct fashions: decode of the V-FLD of PUT OPs and the decode of bits from the First Output Control Register 37 in the State Machine Processor (FIG. 3).

Figure 8A:
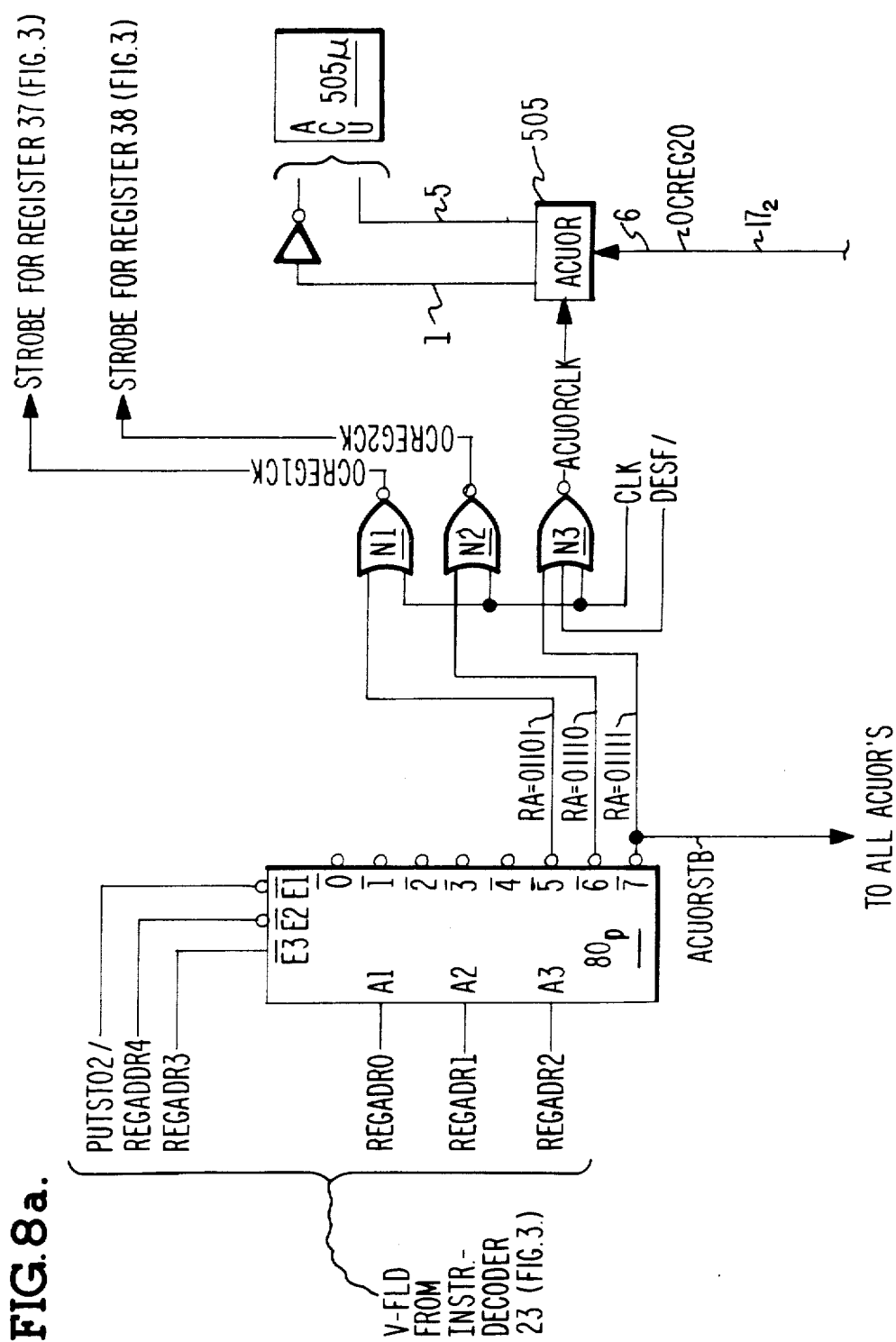
FIG. 8a is a drawing showing the circuitry for addressing and loading of a selected ACU-Output Register.

The ACUOR 505 is addressed when a one-of-eight decoder $80_p$, FIG. 8a decodes the PUT OP V-FLD (4:5) equal 01111 and a Strobe No. 2 is sent from the State Machine Processor. This decoding is performed only on the Single Line Adapter card and is sent to other Line Adapter cards via the frontplane connector. This decoded signal is received by a three input NOR gate (N3, FIG. 8a) in each Line Adapter (whose other inputs are Clock and Designate FF). The output of this gate drives the clock input of the six bit ACU output register.

Data from the Second Output Control Register 38 (FIG. 3) will then be strobed into the ACUOR 505, FIG. 8a.

In FIG. 8a, decoder $80_p$ receives, as input, bits 0–4 from the decoder-controller 23 of FIG. 3, and also the Strobe #2 signal from the State Machine Processor 600. When the Register Address RA=01111, NOR gate N3 will clock data (from Register 38, FIG. 3) into ACU-output Register 505.

Figure 8B:
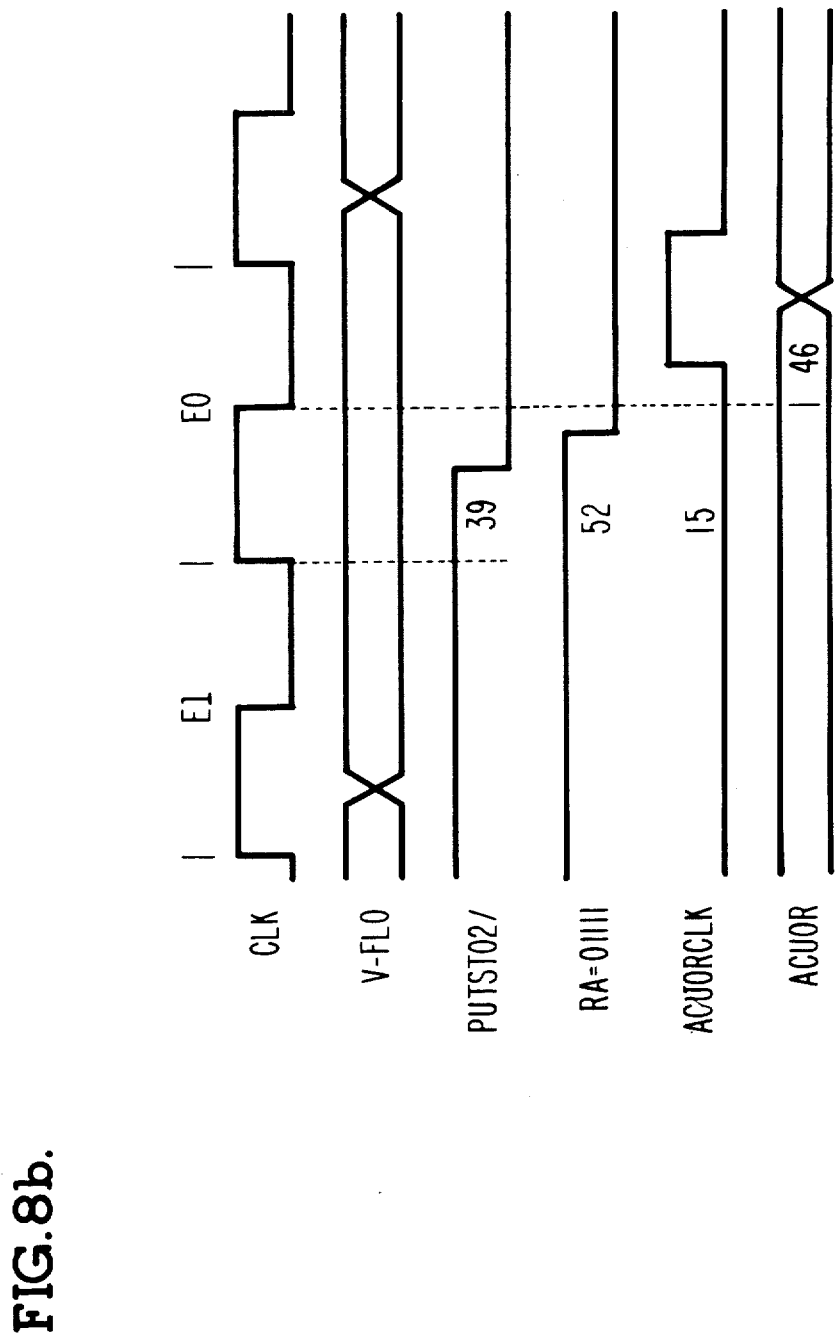
FIG. 8b is a timing diagram showing the sequence of operations.

FIG. 8b shows the timing sequence whereby the PUT Strobe, the Register Address, and the ACUOR-CLK signals permit loading of the ACU-Output Register 505.

To particularize the use of ACU-Output Registers for their function of sending dialing digits and control signals to an Automatic Calling Unit (such as $505_u$):

(a) the State Machine 600 will use its Second Output Control Register 38 to accumulate dial digits and control signals.

(b) The State Machine 600 will initiate a PUT OP to load dial digits and control bits into the Second Output Control Register 38 (FIG. 3) using a PUT Strobe 2. The fields used are:

| OP  | V-FLD | D-FLD | Data |                                                                                   |
|-----|-------|-------|------|-----------------------------------------------------------------------------------|
| PUT | 01110 | X001  | XXnn | where nn = data put into the Second Output Control Reg. 38 (OCReg 20n)            |

(c) The State Machine 600 will then use another PUT OP to load the selected ACU-Output Register where the fields are:

| OP  | V-FLD | D-FLD |
|-----|-------|-------|
| PUT | 01111 | X001  |

As a result, the selected ACU-Output Register will now hold the dial-digit data and control data received from OCREG $20_n$ on line $17_2$ (FIG. 8a).

(d) When gate N3 of FIG. 8a is activated by the signals of CLK, DESF/ and RA=01111, then the ACU-Output Register is clocked to pass its data onto the Automatic Calling Unit, as $505_u$ in FIG. 8a.

It should be understood that each of the ACU-Output Registers ($505_0$, $505_1$, $505_2$ and $505_3$) of FIG. 2 can be selected for conveying dial data and control data to its own Automatic Calling Unit.

The Second Output Control Register 38 (FIG. 3) is given the acronym OCREG20n in FIGS. 2 and 8a. Using 6 bits of the 8-bits of Output Control Register 38, the bit positions 0-5 are used as follows:

| Second Output Control |            |
|-----------------------|------------|
| Register Bit #        | ACU Signal |
| 0                     | NB1 ⎫      |
| 1                     | NB2 ⎬ Decimal |
| 2                     | NB4 ⎭ Dial-Digit |
| 3                     | NB8        |
| 4                     | DPR - Digit Present |
| 5                     | CRQ - Call Request | when OC-Register 38 has "0" placed in bit positions 4:5, (i.e., starting at bit position #4, the 5 positions 4,3,2,1,0 are set to "0"), then this represents an "ON" condition to the Automatic Calling Unit.

If a "1" is placed in bit position #5, then this represents an "ON" condition for the Call Request.

CRQ is a signal from the line adapter to the ACU (Automatic Calling Unit) such as an 801C, that the line adapter wishes to place a call (i.e., a dial a number).

The DPR (digit present) is a signal from the line adapter to the ACU in response to a PND (Present Next Digit) signal from the ACU as seen in FIG. 7. It means that the data in NB1-NB8 is one of the dial numbers.

The RS-232 Electrical Interface (EI) allows for many different styles and types of data sets (modems) to be connected. Some of these modems have extra or special functions which can be controlled via the electrical interface. For example, the Western Electric 201-A data set contains a signal "New Sync"—NS; the 202 C/D data set contains a signal "Supervisory Transmit Data'-'—SA; the 811-B data set has an "EOT Detected" signal ED (end of transmission-detected).

In order to make use of the few available lines on the interface between the line adapter and the electrical interface (EI), these lines have been doubly used for providing control over these "special function" signals. Thus, logic circuitry was placed on the EI card and the existing lines (CRQ and NB1) were used to provide the control functions. Jumpers were used to connect the "special control" function to the appropriate pin in the connection cable.

When CRQ is "off", then this represents the situation where no dialing is occurring and thus the $NB_n$ line is available for use and the firmware in the state machine processor would control the logic circuitry as desired.

The special control function signals NS, SA, ED are indicated below for certain data sets. Manuals of the Bell Telephone Co. are available for detailed use of the NS, SA and ED signals.

For certain data sets, the ACU-Output Register 505 is used as a "special control" function. By maintaining OC Register 38 (FIG. 3) so that bit position #5 is OFF (="0") and by controlling bit position #0, the control lead to the data set can be turned ON/OFF.

This "special control" function is jumpered to one of the following listed signals on the Electrical Interface card to provide functions as follows:

| SIGNAL | FUNCTION                 | DATA SET |
|--------|--------------------------|----------|
| NS     | New Sync                 | 201      |
| SA     | Reverse Channel Transmit | 202      |
| ED     | Fast Disconnect          | 811-B    |

Thus, operationally the special control function can be summarized as follows:

(a) The bit position #0 of OC-Reg. 38 can be loaded, via Strobe #2 signal, to read "0" (=OFF) or "1" (=ON). This is done by the following instruction fields:

| OP  | V-FLD | D-FLD | DATA |                           |
|-----|-------|-------|------|---------------------------|
| PUT | 01110 | X001  | XXOn | where n can be a "0" or "1" |

(b) The ACU-Output Register (as 505, FIG. 8a) is loaded (with the data residing in the Second Output Control Register 38) by the following instruction fields:

| OP  | V-FLD | D-FLD |
|-----|-------|-------|
| PUT | 01111 | X001  |

(c) In this situation, if the bit position #0 of the OC-Register 38 held a "1", then the "special function" control signal would be "ON". If the bit position #0 held a "0", then the "special function" control signal would be "OFF".

Chip Selection:

Addressing a USART or Timer on a designated Line Adapter is the same as "chip selecting" the component. This is accomplished with bits 0 and 1 of the First Output Control Register 37 in the State Machine Processor along with the Designate Flip-Flop (FIG. 5) in a Line Adapter.

Each Line Adapter will "AND" its Designate FF with bits 0 and 1 in order to provide a UCS (USART Chip Select) or a TCS (Timer Chip Select) for its USART or Timer.

The use of bits 0 and 1 in the First Output Control Reigster 37 is as follows:

TABLE Y-2

| Register Bit and Value | Signal Designation |
|---|---|
| Bit 0 = 1 | USARTCS = USART Chip Select-UCS |
| Bit 1 = 1 | TMRCS = Timer Chip Select TCS |

The remaining bits of Register 37 are used for control signals, primarily for the USART and Timer.

Random Access Memory (550m, FIG. 5):

Each data comm line has 2,048 words of RAM available for its use. A word is equal to 16 data bits plus one parity bit. In FIG. 5 the RAM chip $550_m$ is a 4,096×1 bit static RAM with a Read Acces time of 180 nanoseconds and is arranged with 17 chips making 4,096 words. On the DLI/LA card, 2,048 words are for the "Single" Line Adapter and 2,048 words are for the Data Link Interface. The "Quad" Line Adapter card (FIG. 2) provides 34 memory chips or 8,192 words of which 2,048 words are available for each line.

The data comm Line Adapter memory (for any line) is "pointed at" by the memory address lines, MADDR (15:5) equal 01110. This can be seen in FIG. 5 which shows the Data Link Interface/Line Adapter RAM $550_m$. A five bit Comparator $100_c$ on the DLI/LA card compares (for an "equal" condition) for (i) DLI memory selection; or for a "greater than" condition (MADDRnn 01110) which provides for (ii) Line Adapter RAM selection such as $550_{m1}$ or $550_{m2}$. The signal "LARAMSEL" (Line Adapter RAM Select) will go to all Line Adapter cards via the frontplane cable to select the "designated" Line Adapter RAM memory. If memory address lines MADDR (15:5) equal 0111x (DLI or LA Select) then a slow memory flip-flop (SLMF) $100_{sf}$ will be set equal to 1. The flip-flop $100_{sf}$ output (FIG. 5) drives an open collector NAND gate whose output connects to WAIT/frontplane signal line to the State Machine Processor. This signal (WAIT/), when low, will force the State Machine Processor to "wait" until the signal goes "high". Using a RAM chip whose Read Access time is 180 nanoseconds requires the State Machine Processor to wait for one clock time, thereby when the DLI memory ($550_m$, FIG. 5) or any Line Adapter memory is selected, the SLMF (slow memory flip-flop) will be "on" for one clock and then toggle off.

Selection of the RAM memory $550_m$ on the DLI/LA card is done via MADDR (15:5) equal to 01110 or else if MADDR (15:5) equal 0111 and the Designate Flip-Flop being ON then a particular Line Adapter RAM is selected. This logic controls the chip-select input on the RAM chips. The selection of RAM for DLI or for Line Adapter memory is handled by controlling the "A-11" address pin on the RAM chip. FIG. 5 illustrates the typical setup for each RAM in the system as having its own individual A-11 input from its own individual DESF. If MADDR (15:5) is equal to 01111 and the Line Adapter Designate Flip-Flop (DESF) is ON, the particular RAM is chip selected and the A-11 address input is TRUE.

The "Quad" Line Adapter card (FIG. 2) contains two groups of memory chips ($550_{m1}$, $550_{m2}$) wherein Data-Comm (D.C.) lines 0 and 1 on the card share the same group of RAM chips and Data-Comm lines 2 and 3 share the other group of RAM chips. The signal LARAMSEL (Line Adapter RAM select, FIG. 5) goes to all Line Adapters and is then essentially ANDED with appropriate Designate conditions to allow the desired RAM group to be chip selected. A "division" of RAM for the first or second data-comm line on a "Quad" Line Adapter is handled by controlling the "A-11" address pin (FIG. 5) on the RAM chip (signal DESn where n=1) and for the third and fourth line, the "A-11" pin on the second group of RAM chips is controlled by DESn (FIG. 5) where n=3.

A "Dual" Line Adapter will only contain one group of memory chips (17) and will operate the same as line 0 and line 1 on the Quad Line Adapter. Data to be written into RAM must be placed on the I/O bus 10 by the State Machine Processor and "read data" will be sent to the State Machine Processor on the MEMOUTnn bus 12 (nn equals 00→16).

Clear:

There are two methods of clearing used to clear the Line Adapters; these are "Power Up" Clear and "Designate" Clear.

The Power Up Clear is a signal which occurs during the power-up sequence for the cabinet housing the Line Adapters. The signal comes from the backplane of the Base Module cabinet and is active low.

The Designate Clear is a function controlled by the State Machine Processor, and only the Line Adapters which are designated are the ones that get cleared. The Clear signal originates from bit 7 of the First Output Control Register 37 of the State Machine Processor (FIG. 3). The "Power-up" Clear operates to clear three components on the Line Adapter. These are: the Designate Flip-Flop; the Auto Call Output Register; and the USART.

The "Designate" Clear signal clears two components on the Line Adapter. These are: Auto Call Unit Output Register (ACUOR); and the USART.

USART Organization and Operation:

The USART is a MOS/LSI device housed in a 40-pin Dual-in-line package and is TTL compatible on all inputs and outputs. The USART performs the functions of interfacing a "serial" data communications channel to a parallel digital system and is capable of full duplex communications with synchronous or asynchronous systems.

One preferred embodiment of the USART is that manufactured by Western Digital Corporation, 3138 Redhill Avenue, Newport Beach, Calif. 92663 and is designated as Model UC1671 Asynchronous/Synchronous Receiver/Transmitter and described in their Technical Data Publication of August 1978 which includes a block diagram showing the various registers, controls and components which are briefly described herein below.

(i) Receiver Register (RR): this is an eight bit shift register which inputs the received data at a clock rate determined by an internal control register. The incoming data is assembled to the selected character in length and then transferred to the Receiver Holding Register with logic zeroes filling out any unused high-order bit positions. At this time the INTR (Interrupt) output is made active for informing the State Machine (600, FIG. 3) that the Receiver Holding Register contains valid data.

(ii) Receiver Holding register (RHR): this is an 8-bit parallel buffer register which presents assembled receiver characters to the DAL (Data Access Line) bus lines (FIG. 2) when requested through a Read operation.

(iii) Comparator: the 8-bit comparator is used in the Synchronous Mode to compare the assembled contents of the Receiver Register and the SYN register or the DLE register. A "match" between the registers sets up the stripping of the received character (when programmed) by preventing the data from being loaded into the Receiver Holding Register. A bit in an internal Status Register is set when stripping is performed. The comparator output also enables character synchronization of the Receiver on two successive matches with the SYN register.

(iv) SYN Register: this is an 8-bit register which is loaded from the DAL (Data Access Line) lines (FIG. 2) by a Write operation and it holds the synchronization code used to establish receiver character synchronization. It serves as a fill character when no new data is available in the Transmitter Holding Register during transmission. This register cannot be read onto the DAL lines. It must be loaded with logic zeroes in all unused high-order bits.

(v) DLE Register: this is an eight bit register which is loaded from the DAL lines by a Write operation and holds the "DLE (Delimiter) character used in the Transparent Mode of operation, in which an idle transmit period is filled with the combination DLE/SYN pair of characters rather than a single SYN character. In addition, the USART may be programmed to force a single DLE character prior to any data character transmission while in the "transmitter transparent mode".

(vi) Transmitter Holding Register (THR): this is an eight-bit parallel buffer register which holds parallel transmitted data transferred from the DAL lines by a Write operation. This data is transferred to the Transmitter Register (TR) when the transmitter section is enabled and the Transmitter Register is ready to send new data. During this transfer, the signal interrupt (INTR) is made active for informing the Line Support Processor that the Transmitter Holding Register is empty.

(vii) Transmitter Register: This is an eight-bit shift register which is loaded from the THR (Transmitter Holding Register), the SYN Register, or the DLE register. The purpose of this register is to serialize data and present it to the transmitted Data Output Lines.

(viii) Control Register: There are two eight-bit control registers (CR1, CR2) in the USART which hold device programming signals such as: mode selection, clock selection, interface signal control, and data format. Each of the control registers can be loaded from the data access lines (DAL) by a Write operation, or else read into the DAL lines by a Read operation. By designation, "CR16" would repesent bit 6 of Control Register 1. And "CR23" would represent bit 3 of Control Register 2.

(ix) Status Register: This is an eight-bit register which holds information on communication errors, interface data register status, match character conditions, and communication equipment status. This register can be read onto the DAL lines by a Read operation.

(x) Data Access Lines (DAL): The DAL is an eight-bit bi-directional bus port over which all addresses, data, control, and status transfers occur. Besides transferring data and control words, the DAL lines also transfer information relating to addressing of the device, reading and writing requests, and interrupting information.

Operation of USART of Byte Oriented Line Adapter:

ASYNCHRONOUS MODE: The framing of asynchronous characters is provided by a Start Bit (logic low) at the beginning of a character, and by one or more Stop Bits (logic high) at the "end" of a character. Reception of a character is initiated on recognition of the first Start Bit by a positive transition of the receiver clock, right after a proceeding Stop Bit. The Start and Stop bits are "stripped off" while assembling the serial bit input into a parallel character.

The character assembly is completed by the reception of the Stop Bit after the reception of the last character bit. If this bit is a logic "high", the character is determined to have "correct" framing and the USART is prepared to receive the next character. If the Stop Bit is logic "low", the Framing Error Status flag is set and the Receiver assumes this bit to be the Start Bit of the next character. Character assembly continues from this point if the input is still a logic "low" when sampled at the theoretical center of the assumed Start Bit. As long as the Receiver input is "spacing" (i.e., receiving a Space rather than a Mark), then all zero characters are assembled, and error flags and data received interrupts are generated so that line breaks can be determined. After a character of all zeroes is assembled along with a zero in the Stop Bit location, the first-received logic "high" is determined as a Stop Bit and this resets the receiver circuit to a "Ready" state for assembly of the next character.

In the Asynchronous Mode the character transmission occurs when information contained in the THR (Transmitter Holding Register) is transferred to the TR (Transmitter Register). Transmission is initiated by the insertion of a Start Bit, followed by the serial output of the character (least significant bit first) with parity, if enabled, following the most significant bit; then there is the insertion of the 1-, 1.5-, or 2-bit length Stop condition. If the THR (Transmitter Holding Register) is full, the next character transmission starts after the transmission of the Stop Bit of the present character in the TR (transmitter register). Otherwise, the "Mark" (logic high) condition is continually transmitted until the THR (Transmitter Holding Register) is loaded.

SYNCHRONOUS MODE: The synchronization of messages is carried out by a special Synchronization Character Code (SYN) transmitted at the beginning of a block of characters. The Receiver, when enabled, searches for two contiguous characters matching the bit pattern contained in the SYN register. During the time that the Receiver is searching, data is not transferred to the THR (Transmitter Holding Register) and status bits are not updated; and the Receiver interrupt is not activated. After the detection of the first SYN character, the Receiver assembles subsequent bits into characters whose length is determined by the contents of the USART internal control register. If, after the first SYN character detection, a second SYN character is present the Receiver enters the Synchronization Mode until the Receiver Enable Bit is turned "off". If a second successive SYN character is not found, then the Receiver reverts back to the Search Mode.

In the Synchronous Mode, a continuous stream of characters are transmitted once the Transmitter is enabled. If the THR (Transmitter Holding Register) is not loaded at the time the Transmitter Register has completed the transmission of a character, this "idle" time will be filled by a transmission of a character contained in the SYN register in the Non-Transparent Mode, or filled by the characters contained in the DLE and the SYN registers respectively (while in the Transparent Mode of operation).

RECEIVER OPERATION: The Receiver data input is clocked into the Receiver Register by a 1X Receiver clock from a modem Data Set, or by a local 32X bit rate clock (asynchronous) selected from one of four timer chips. When using the 1X Receiver Clock, the Receiver data is sampled on the positive transition of the clock in the Synchronous Modes. When using a 32X clock in the Asynchronous Mode, the Receive Sampling Clock is phased to the "Mark-To-Space" transition of the Received Data Start Bit and defines (through clock counts) the center of each received Data Bit at the positive transition 16 clock periods later. When the complete character has been shifted into the Receiver Register, it is transferred to the RHR (Receiving Holding Register); the unused, higher number bits are filled with zeroes. At this time the "Receiver Status Bits" (Framing Error/Sync Detect, Parity Error/DLE Detect, Overrun Error, and Data Received) are updated in the Status Register and the Data Received "interrupt" is activated. Parity Error is set if encountered while the Receiver Parity Check is "enabled" in the internal control register. Overrun Error is set if the Data Received Status Bit is not cleared through a Read Operation by an external device when a new character is ready to be transferred to the RHR (Received Holding Register). This error flag indicates that a character has been lost, that is, new data is lost, and the old data and its status flags are saved.

The characters assembled in the Receiver Register that match the contents of the SYN or the DLE register are not loaded into the RHR (Receiver Holding Register), and the DR (Data Received) interrupt is not generated if bit 3 of USART control register 2 (CR23=SYN Strip) or bit 4 of USART control register 1 (CR14=DLE Strip) are set respectively. The SYN-DET and the DLE-DET status bits are set with the next non-SYN or DLE character. When both control register bits CR23 and CR14 are set (Transparent Mode). the DLE-SYN combination is stripped. The SYN comparison occurs only with the character received after the DLE character. If two successive DLE characters are received, only the first DLE character is stripped. No parity check is made in this mode.

TRANSMITTER OPERATIONS: Information is transferred to the THR (Transmitter Holding Register) by a Write operation. Information can be loaded into this THR at any time, even when the Transmitter is not enabled. Transmission of data is initiated only when the Request-To-Send Bit is set to a logic "one" in the USART control register and the Clear-To-Send input is at a logic "low". Information is normally transferred from a THR to the Transmitter Register when the latter has completed transmission of a character. However, information in the DLE register may be transferred prior to the information contained in the THR if the Force-DLE signal condition is enabled (CR15=Force, DLE and CR16=TX Transparent and set to a logic "one"). The control bit CR15 must be "set" prior to loading of a new character in the THR to insure forcing the DLE character prior to transmission of the data character. The Transmitter Register output passes through a flip-flop which delays the output by one clock period. When using the 1X clock generated by the modem Data Set, the output data changes state on the negative clock transition and the delay is one bit period.

When the Transmitter is enabled, a Transmitter "interrupt" is generated each time the THR is empty. If the THR is empty when the Transmitter Register is ready for a new character, the Transmitter enters an "idle" state. During this idle time, a logic "high" will be presented to the Transmitted Data Output in the Asynchronous Mode or the contents of the SYN register will be presented in the Synchronous Non-Transparent Mode (CR16=0). In the Synchronous Transmit Transparent Mode (enabled by bit-6 of USART control register 1=Logic 1), the idle state will be filled by a DLE-SYN character transmission in that order. When entering the Transparent Mode, the DLE-SYN fill-in will not occur until the first forced DLE.

If the Transmitter section is disabled by a reset of the Request-to-Send signal (RTS), any partially transmitted character is completed before the Transmitter section of the USART is disabled. As soon as the CTS signal (Clear-to-Send) goes high, the transmitted data output will go high.

When the Transmit Parity is enabled, the selected Odd or Even parity bit is inserted into the last bit of the character in place of the last bit of the Transmitter Register. This limits transfer of character information to a maximum of 7-bits plus parity or 8-bits without parity. Parity cannot be enabled in the Synchronous Transparency Mode.

INPUT/OUTPUT OPERATION OF USART: All data, Control and Status words are transferred over the Data Access Lines (DALO-7) as seen in FIG. 2, DAL. Additional input lines provide controls for addressing a particular unit and regulating all input and output operations. Other lines provide interrupt capability to indicate to a controller that an input operation is requested by the USART. All input/output terminology is referenced to the Bus Controller-Transceiver 503, FIG. 2, so that a "Read" or input takes data from the USART and places it on the DAL lines to the Transceiver 503, while a "Write" or an Output places data from the Transceiver 503 onto the DAL lines and into the USART. The following input/output terminology discussed below is referenced to the Bus Controller-Transceiver 503.

(i) READ: A Read operation is initiated by the placement of an 8-bit address from State Machine 600 on the DAL by the Bus Controller 503, FIG. 2. When the Chip Select signal goes to a logic "low: state (CS/, FIG. 5), the USART (as 508) compares bits 7-3 of the DAL with its hard-wired ID code (on USART Pins 17, 22, 24, 25, 26) and becomes selected on a "Match" condition. The USART then sets its RPLY line "low" to acknowledge its readiness to transfer data. Bits 2-0 of the address are used to select the USART registers to "read from" as follows:

TABLE Y-3

| Bits 2-0 | Selected Register of USART |
|---|---|
| 000 | Control Register 1 |

TABLE Y-3-continued

| Bits 2-0 | Selected Register of USART |
|---|---|
| 010 | Control Register 2 |
| 100 | Status Register |
| 110 | Receiver Holding Register |

When the Read Enable (RE) input line of the USART is set to a logic "low" condition by the State Machine 600, the USART gates the contents of the addressed register onto the DAL bus. The Read operation terminates, and the devices become unselected, and both the Chip Select and Read Enable return to the logic "high" condition. Reading of the Receiver Holding Register clears the DR (Data Received) status bit. Bit zero must be a logic "low" in Read or in Write operations.

(ii) WRITE: A Write operation is initiated by making a Chip Select input to go to the logic "low" state. Bits 2-0 of the address are used to select USART registers which are written into as follows:

TABLE Y-4

| Bits 2-0 | Selected Register of USART |
|---|---|
| 000 | Control Register 1 |
| 010 | Control Register 2 |
| 100 | SYN and DLE Register |
| 110 | Transmitter Holding Register |

When the Write Enable (WE) line is set to a logic "low" condition by the State Machine, the USART gates the data from Transceiver 503 onto the DAL bus and into the addressed register. If data is written into the Transmitter Holding Register (THR), the THRE (THR empty) Status Bit is cleared to a logic zero.

The "100" address loads both the SYN and DLE registers. After writing into the SYN register, the device is conditioned to write into the DLE register if followed by another Write pulse which has the "100" address. Any intervening Read or Write operation with another address resets this condition such that the next "100" will address the SYN register.

(iii) INTERRUPTS: The following conditions will generate interrupts:
1. Data Received (DR)—indicates transfer of a new character to the Receiver Holding Register (RHR) while the Receiver is enabled.
2. Transmitter Holding Register Empty (THRE-)—indicates that the THR register is empty while the Transmitter is enabled. The first interrupt occurs when the Transmitter becomes enabled if there is an "empty" THR, or after the character is transferred to the Transmitter Register, thus making the THR empty.
3. Carrier On—this indicates the Carrier Detector input has gone "low" when DTR is "on". (DTR=Data Terminal Ready).
4. Carrier Off—indicates that the Carrier Detector input has gone "high" when DTR is "on".
5. DSR On—indicates the Data Set Ready input has gone "low" when DTR is "on".
6. DSR Off—indicates the Data Set Ready input has gone "high" when DTR is "on".
7. Ring On—indicates the Ring indicator input has gone "low" when DTR is off.

Each time an Interrupt Condition exists, the INTR output from the USART is made a logic "low". The State Machine then acknowledges the Interrupt Request by setting the CS (Chip Select) and Interrupt Acknowledge Input (IACK) to the USART to a "low" state, otherwise the Interrupt Condition (INTR) would never get reset.

Auto Call Operation: (For operations Using an 801 Auto Call Unit)

The 801 ACU has a 4-bit interface for receiving digits of the call number to be dialed. This interface is defined by the EIA Standard RS-366 and involves the following signals:

TABLE Y-5

| Call Request | CRQ |
|---|---|
| Data Line Occupied | DLO |
| Present Next Digit | PND |
| Digit Present | DPR |
| Data Set Status | DSS |
| Abandon Call and Retry | ACR |
| NB 8 | Digit |
| NB 4 | Digit |
| NB 2 | Digit |
| NB 1 | Digit |

The dialing sequence, as illustrated in FIG. 7, operates as follows:

The Line Adapter turns CRQ "on: provided that the DLO is "off". After detection of the dial tone, which is done by the 801, the digits are transferred one at a time. to the 801. The 801 converts the digits to signals which duplicate the function of a rotating dial-pulse or a touch-tone frequency compatible signal. These signals are transmitted to the phone line. At call completion, DSS comes "on" to signify receipt of answer tone from the called Data Set. Receipt of DSS allows the line to be transferred to the ACU associated data set. If DSS fails to come "on", the Abandon Call and Retry (ACR) timer begins timing out.

With pulse dialing, a typical 10 digit number takes 15 seconds to dial; for touch-tone dialing the same number requires approximately one second. The answer sequence begins sometime after the last digit has been sent by the 801.

Figures 9, 9A:
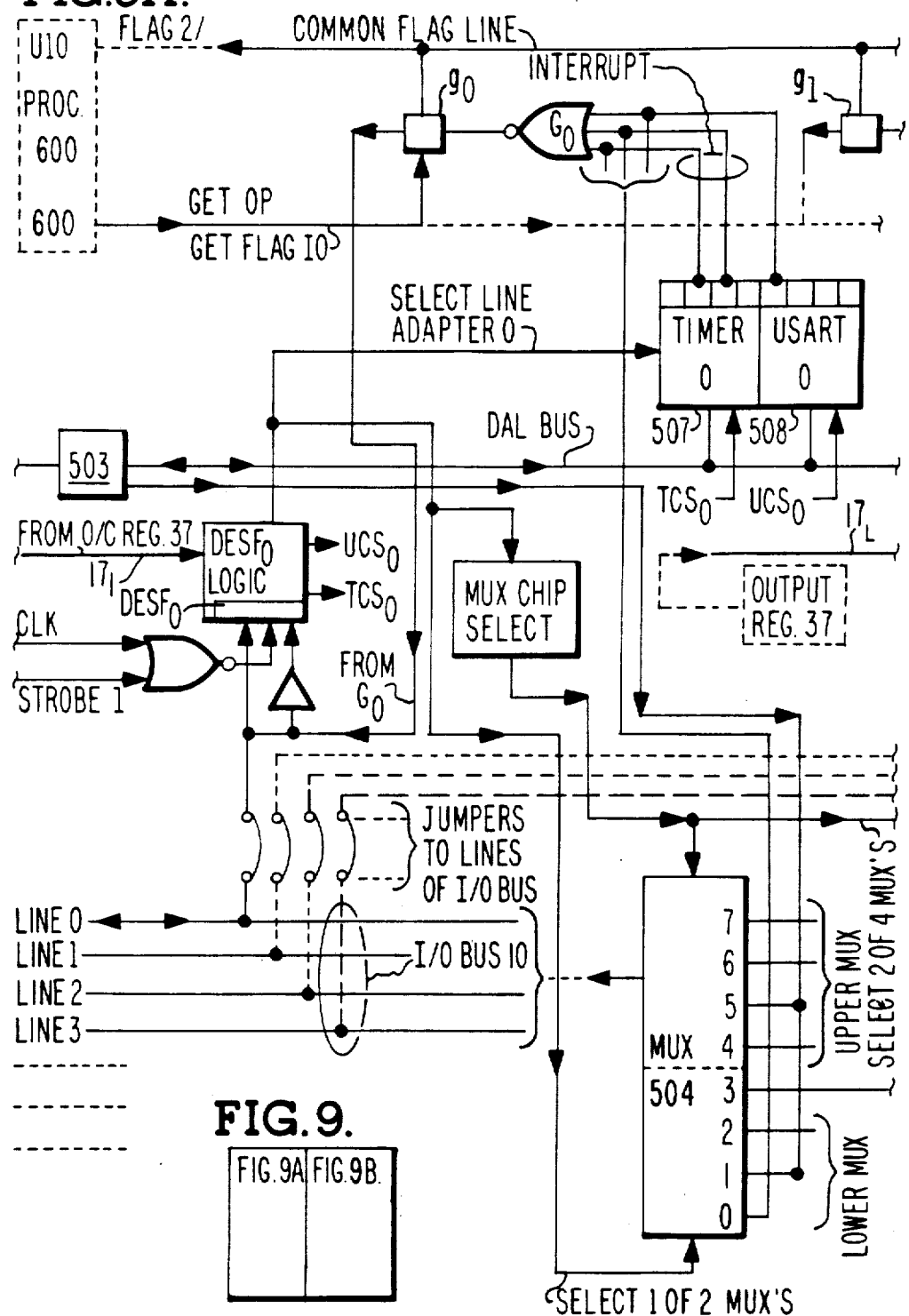
FIG. 9 is a schematic drawing of an expanded version of FIG. 6 which indicates a more detailed view of the multiple line adapter organization.
Figure 9B:
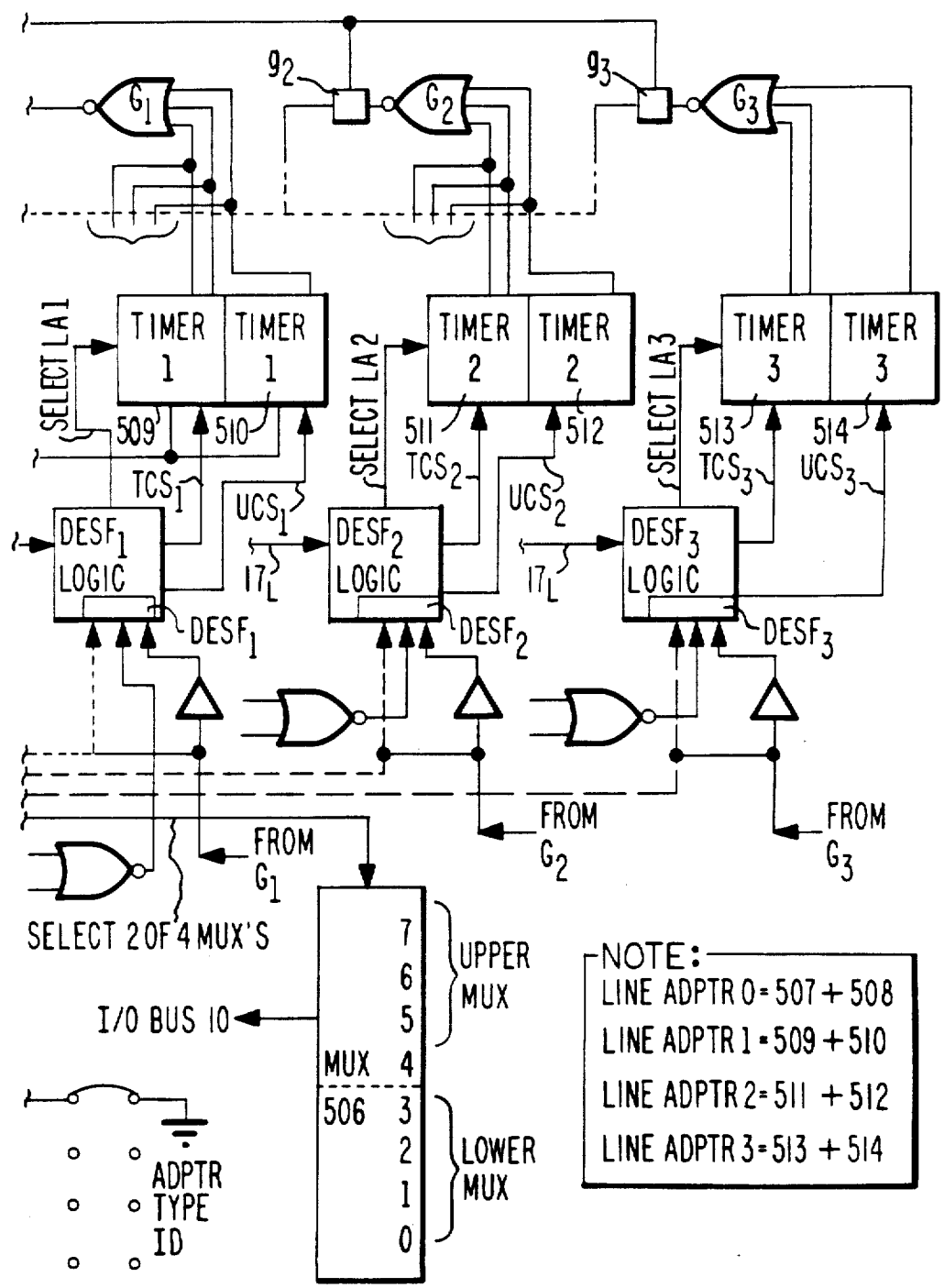

Referring to FIG. 9 there is shown a schematic representation of the multiple line adapter organization which indicates how the basic operating circuitry is repeated for each individual line adapter. Each line adapter is numerically designated as line adapter 0, line adapter 1, line adapter 2 and line adapter 3 and corelates to the abbreviated schematic of FIG. 2.

Figure 14:
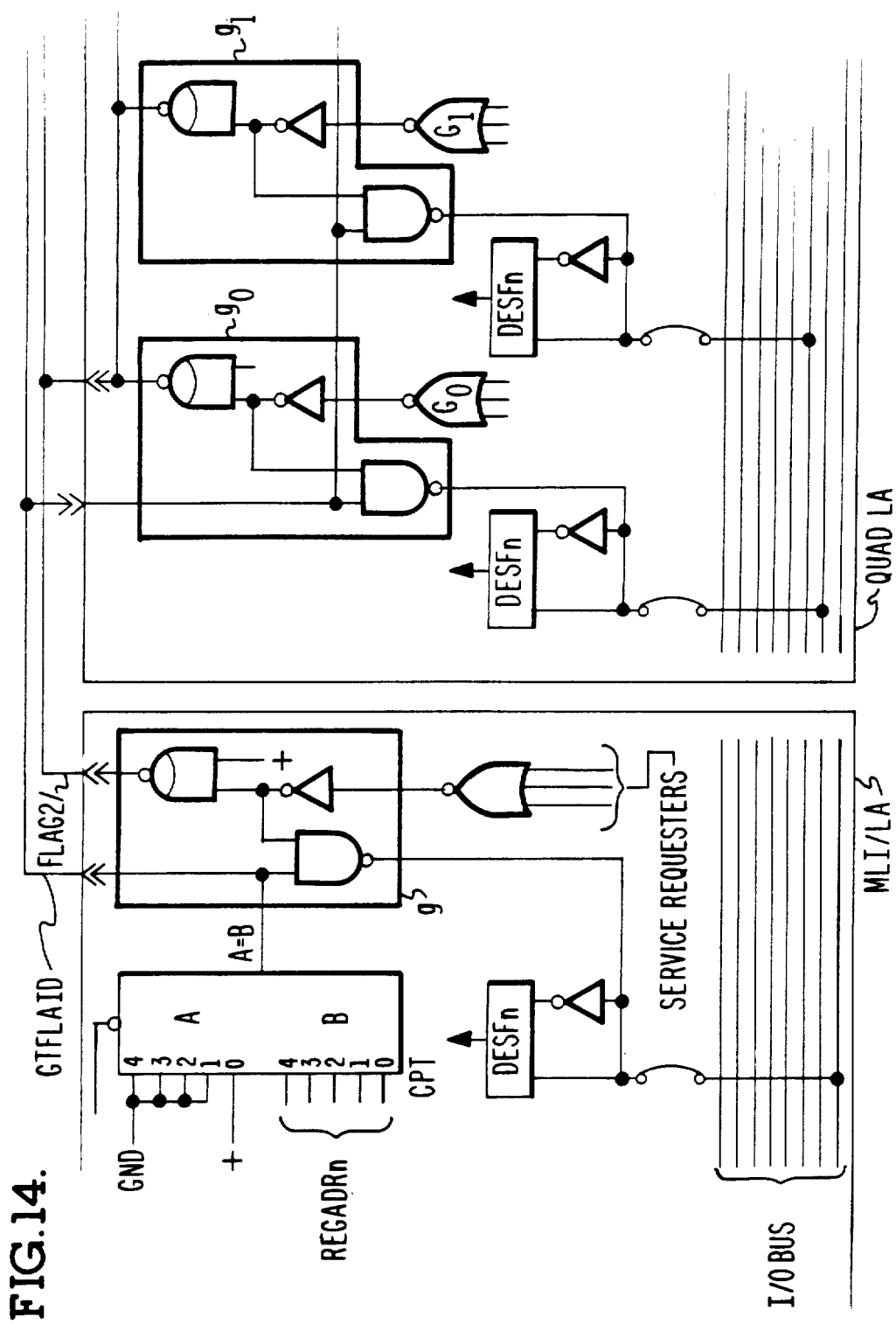
FIG. 14 is a schematic drawing showing the connections for the routing means $g_0$, $g_1$, $g_2$, $g_3$ of FIG. 9.

In FIG. 9 it will be seen that each line adapter has one interrupt line from its USART and two interrupt lines from its timer means (which includes program timer 1 and program timer 2). These interrupt lines respectively connect to a set of gating means for each line adapter which are designated as $G_0$, $G_1$, $G_2$ and $G_3$. The output signal line of each of these gates $G_n$ will individually have a routing means shown as $g_0$, $g_1$, $g_2$ and $g_3$. These routing means are shown in more detail in FIG. 14 which shows a typical routing means such as $g_0$ and $g_1$ which are essentially duplicates of each other except that they connect to different gating means.

Figure 12:
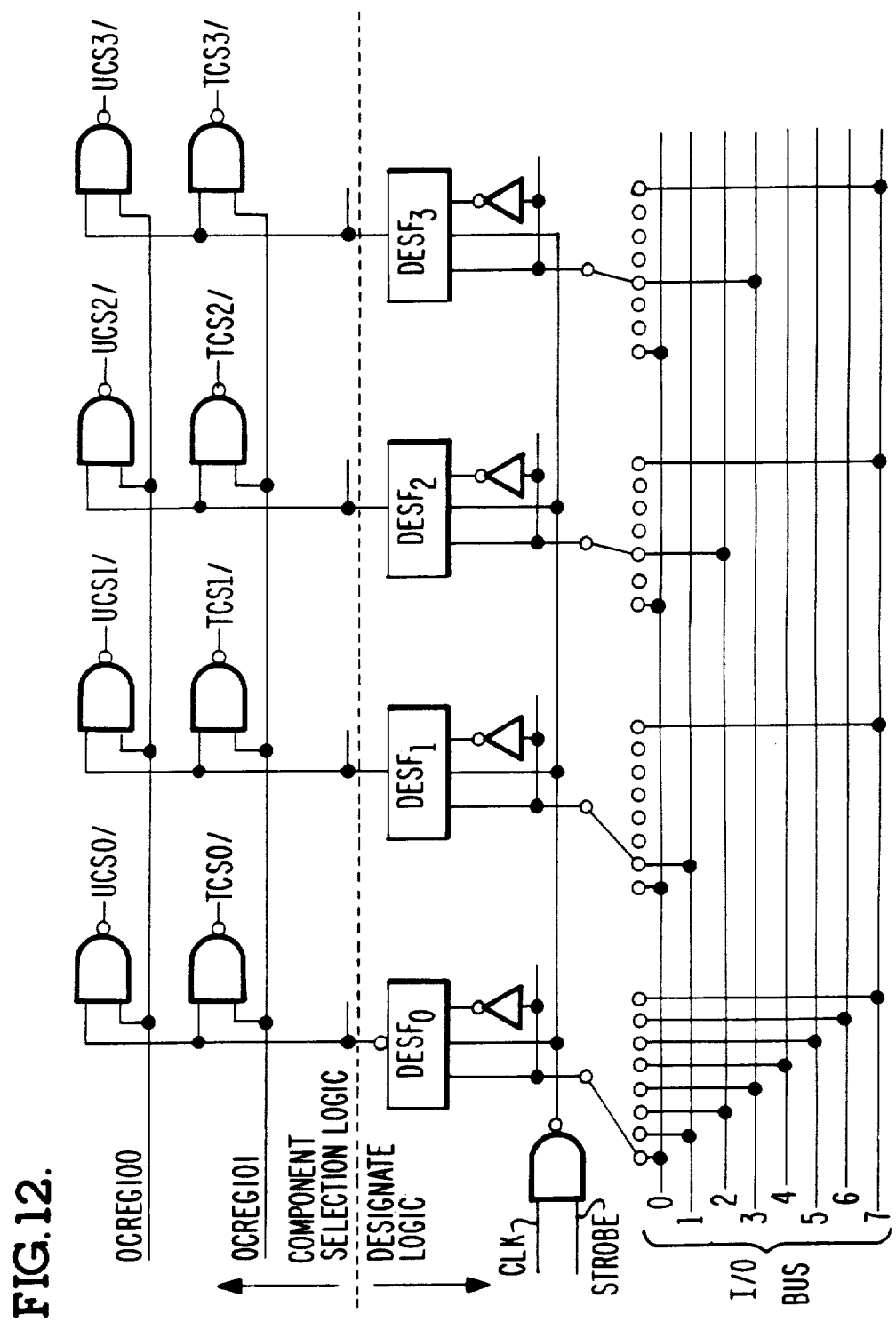
FIG. 12 is a schematic drawing showing the designate logic and component selection logic of FIG. 9.

As seen in FIG. 9 each line adapter will have its own designation logic means and its own component selection means which are shown in more detail in FIG. 12. Here it is seen that a series of flip-flops ($DESF_n$) connect to separate groups of component selection logic which is dedicated to each of the line adapters. Thus, in FIG. 12, signals from the first control register of the microprocessor 600 (of FIG. 3) can select either a USART chip select line or else the timer chip select line. However, this will only be operable if a selected or designated flip-flop of a particular line adapter has been activated in order to select the component of that particular line adapter. FIG. 12 also shows how the clock and strobe signals from the microprocessor 600 provide an input to each of the designate flip-flops and also how each of the designate flip-flops has a different connection line to a different bus-bit of the I/O bus 10.

Figure 10:
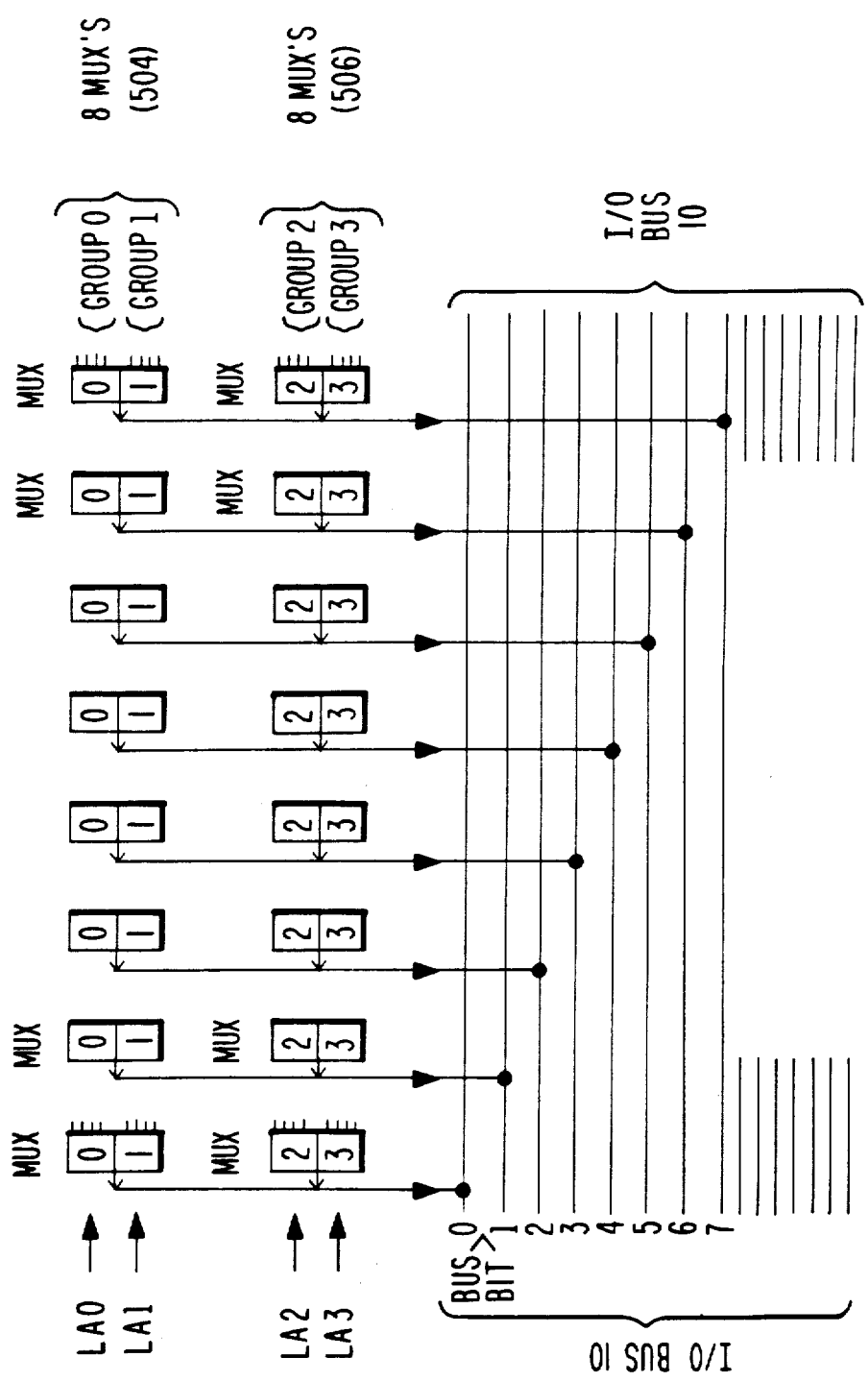
FIG. 10 is a schematic drawing showing the use of four "groups" of multiplexors where each "group" services eight bit-lines which connect to the I/O bus.

FIG. 10 is a schematic drawing showing how the multiplexors are set up in groups of eight so that each line adapter has available to it a group of eight multiplexors which are able to handle eight specific bit lines which connect to the I/O bus 10. Thus, a full byte or eight bits of data can be parallel-transferred from a designated line adapter through a particular group of multiplexors in order to transfer data to the I/O bus 10.

Figure 11:
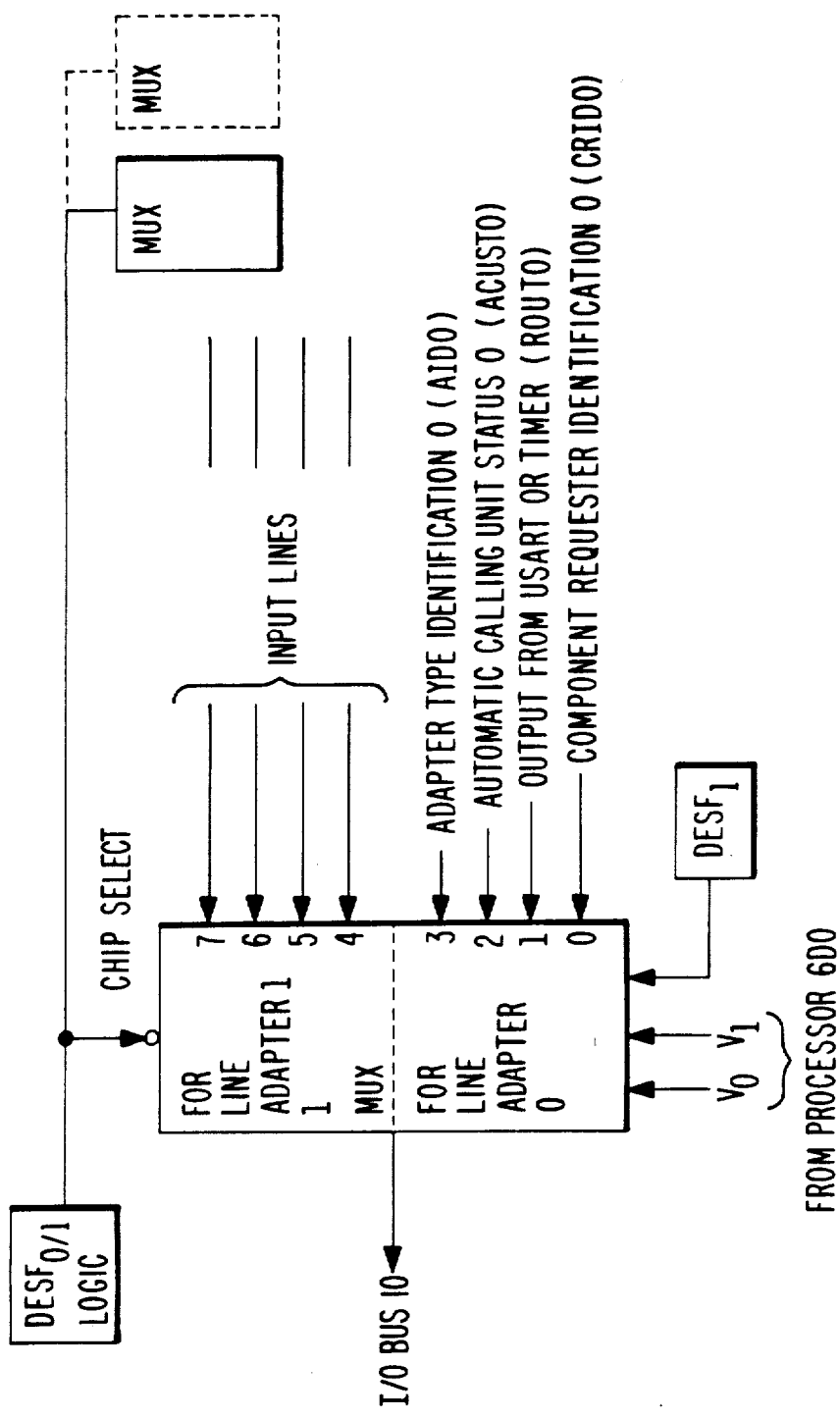
FIG. 11 is a sketch showing how a given multiplexor chip is selected in order to further select the upper multiplexor or lower multiplexor of each group.

FIG. 11 is a schematic drawing showing how the designate flip-flop logic can be activated in order to select a particular "group" of multiplexors by means of a chip select signal. Thus, the designate flip-flop logic (of FIG. 12) can be used to select a particular "group" of eight multiplexors after which one of the designate flip-flops such as $DESF_1$ of FIG. 11 can be activated to select either the upper half (for line adapter 1 in this case) or the lower half (for line adapter 0 in this case) multiplexor for operative use in any given cycle.

In FIG. 11 the instruction signals designated $V_0$ and $V_1$ are instruction data from the microprocessor 600 which will cause the selection of one input line from among the four input lines shown coming into a multiplexor. Thus, the output from either a USART or a timer of line adapter 0, which connects to the input pin number 1, can be selected as a signal which will be conveyed on the MUX output line over to the I/O bus 10.

As indicated in FIGS. 2, 3, 4 and 6, there is an output control register 1, designated as element 37 in these figures, which can provide control data to the component selection logic shown in the upper portion of FIG. 12. There are eight bits available for output from the output register 37 and bit four is used to provide a read enable signal ($\overline{RE}$). This $\overline{RE}$ signal is connected to the bus driver 503 and also to each of the USARTs and timers in each of the line adapters. It may be noted in FIGS. 2 and 4 that the transceiver bus driver 503 also has a data input line designated DIN $17_2$ which is used to carry data to the line adapters. This data is received from the microprocessor 600 by means of the second output register 38.

There is an important distinction between those items and components which can "request service" and the particular items which can be "read from".

(a) Items requesting service: the components that can actually request service from the microprocessor 600 are: each of the USARTs in each of the line adapters, and each of the program timers in each line adapter (program timer 1, PT1, and program timer 2, PT2).

(b) Elements capable of being read from: there are six elements or items which can be "read from". These are the previously mentioned USARTs and program timers in addition to the following:

CRID—component requestor identifier;
ACUST—automatic calling unit status;
ADID—adapter identification signal done via settable jumpers.

The microprocessor 600, which was designated as a universal input output state machine and described in the previously cited patents included by reference, uses what is called a PUT operator in order to place data into a designated location and also has another operator called the GET operator which is used to retrieve and "get" data from a particular location. These PUT and GET operators provide many types of functions in the system, but basically provide the functions of either putting out data or getting data in various contexts of use in the system. The use of these PUT and GET operators has been described in the previous recited reference patents.

Figure 13:
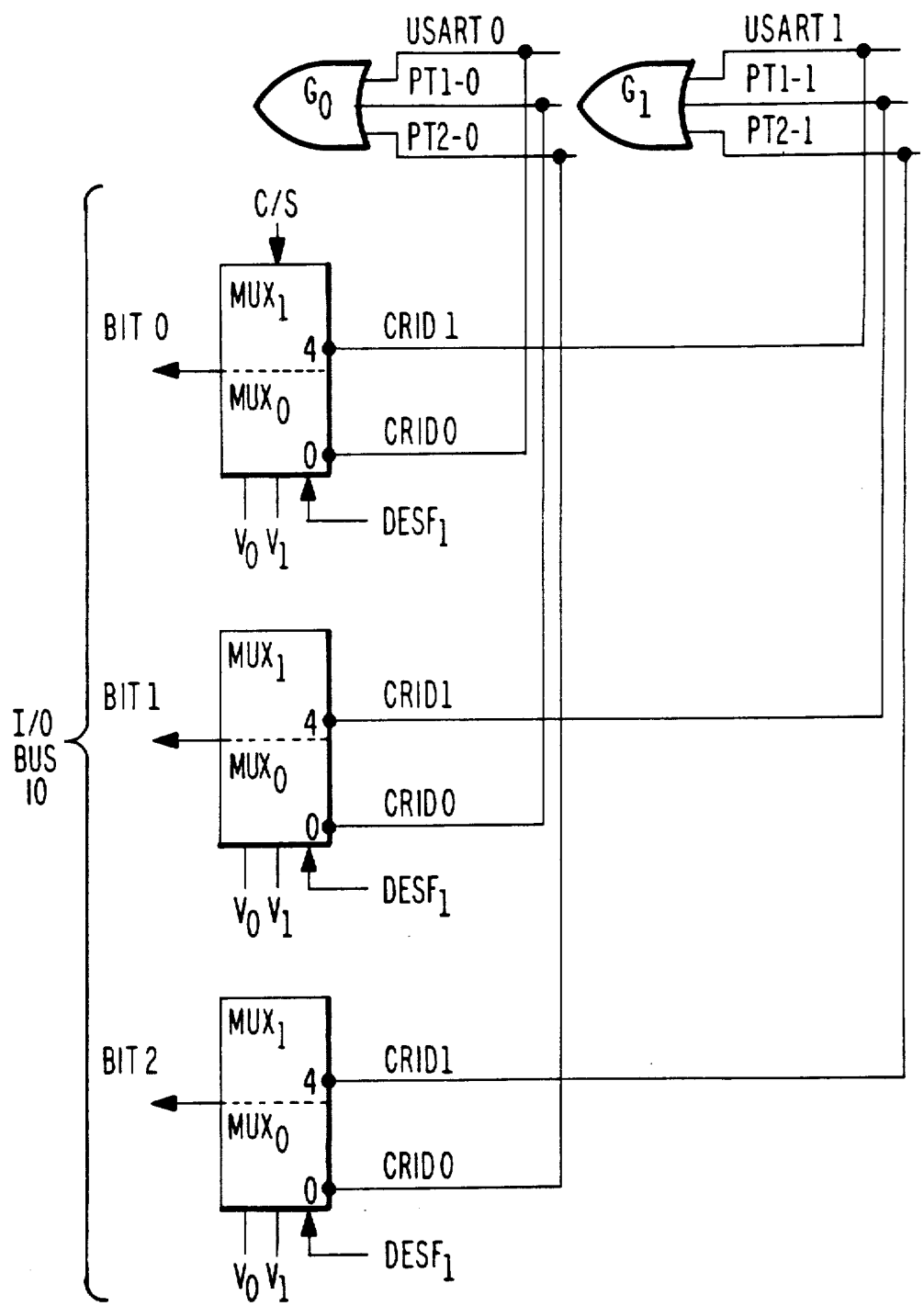
FIG. 13 is a drawing showing how the USARTs and Timers of different line adapters connect to the lower and upper multiplexor groups.

Referring to FIG. 13, there is a schematic drawing showing how the interrupt request line from either a USART or the first program timer PT1 or the second program timer PT2 from each of the line adapters is connected to selected multiplexors in order that the interrupt signal may be carried out to specified bit lines of the I/O bus 10. For example, in FIG. 2 and in reference to multiplexor 504, it will be seen that the input pins number 0 and number 4 respectively receive component requestor identification lines from line adapter 0 and line adapter 1. Thus, three of the multiplexors, seen in FIG. 13, of a group of eight multiplexors, can be used to determine which particular component (the USART or the first or second timer) is requesting service since three separate multiplexors of a group of eight multiplexors can thus separate these requesting signals and can activate a different bit line of the I/O bus 10.

In the particular system using the microprocessor 600, the GET OPs will "read out" the I/O bus 10. Thus, the microprocessor 600 when reading out the I/O bus 10 can sense which particular bit line has been activated and thus will indicate an identification of which component is doing the requesting, that is to say, whether it is the USART or the first, or second program timer of a particular line adapter. In each case the operative multiplexor, whether it is the lower half of the multiplexor or the upper half of the multiplexor, will have been selected by a designate flip-flop signal.

It is useful to point out that the I/O bus 10 has a "multiple usage" capability, that is it is used for data transmission to and from the state machine processor 600, but is also useful in setting the "designate flip-flop" $DESF_n$ and also for getting signal data from the gates ($G_0$, $G_1$, $G_2$, $G_3$) in order to locate which line adapter is requesting service attention; and then further, the I/O bus also serves the function of reading out the bus bits 0, 1 and 2 in order to determine which particular component of a designated line adapter is requesting service.

As seen in FIG. 9 and FIG. 12, a strobe signal (strobe 1) from the microprocessor 600 is conveyed to all of the designate flip-flops. Now, one of the designate flip-flops will get a further input according to a previously connected jumper wire to an I/O bus line $bit_n$. This prejumpered wire also serves as connection from the gating means ($G_0$-$G_3$) to the I/O bus line $bit_n$. The microprocessor 600, by using a GET OP, will obtain information from the I/O bus to determine which Line Adapter(s) is requesting service. Subsequently the microprocessor can now address the particular line adapter, designate it, and by selecting the appropriate input signal line of the multiplexor (FIG. 13), then find which particular component of the given line adapter is requesting service, after which it can use its read routine to read out the data from the selected component.

Summary of Overall Read Operations Control (1) Assume an empty buffer in USART 0 which "needs" another byte of data for transmission by its transmitter. (The USART 0 initiates an interrupt signal which activates the signal FLAG 2/).

(2) The microprocessor executes the GET FLAG ID—This allows the microprocessor to identify which line adapter or line adapters are requesting service. The routing logic ($g_o$) permits the output of the gate $G_o$ to activate bit "0" of the I/O bus 10.

(3) Simultaneously the microprocessor reads the I/O bus bit line and finds that bit 0 (for example) is "active".

(4) The microprocessor sets bit 0 and executes a PUT OP with the signal strobe 1 in order to set the designate flip-flop $DESF_0$. Thus, the designate flip-flop $DESF_n$ is set.

(5) Now the microprocessor 600 wants to know "which component" of the "designated" line adapter is requesting service. The microprocessor executes a GET OP in order to read the component requestor ID identifier (CRID).

(6) Referring to FIG. 13, the V field of the GET OP (V=11100) selects the "0" or "4" input to the MUXs (FIG. 11) depending on whether there was a selection of the upper MUXs or the lower MUXs (which is controlled by the $DESF_n$).

(7) Bit 0 of I/O bus 10 receives the output of the MUX and is now active (for USART); the microprocessor 600 will now "read" this data.

(8) Now that the microprocessor knows or has been informed that the USART (of the designated line adapter) needs service, it must first acknowledge the interrupt, and it uses a USART "interrupt acknowledge" procedure which turns off the original interrupt signal.

(9) The microprocessor 600 will now read, for example, the USART status register in order to determine "what it was" which caused the interrupt, for example, that the transmit register buffer is empty and needs data.

(10) The microprocessor will then execute the "USART read procedure" by loading the status register address in the microprocessor's second output register 38.

(11) Register 38 data is sent through the bus driver 503 to the data access lines bus (DAL) and is conveyed to the USART.

(12) The USART chip select (UCS of FIG. 12) is made "active" via a PUT OP via the first output control register 37 (of FIG. 3) and the "designated" flip-flop being set.

(13) Next the PUT OP will also enable the "read enable" ($\overline{RE}$) to the bus driver 503 and to the USART$_0$ in order to allow data from the USART to travel on the DAL bus through bus driver 503 over to the output line designated ROUT, shown in FIG. 2 and FIG. 4. The data out (DOUT) lines (also called DAL) are now connected to the ROUT lines (Read-out).

(14) Then the ROUT line is connected through the MUX 504 to the I/O bus 10. This is done by using the input terminal 1 (or 5) of MUX 504 (V=xxx01), depending on upper or lower MUX selection.

(15) The status register data is connected onto the I/O bus for the microprocessor to examine the data in order to formulate the next instruction.

(16) The microprocessor will now turn "off" the read enable ($\overline{RE}$) and the USART chip select (UCS).

(17) The microprocessor 600 will then go to the next appropriate procedure depending on what was found on the I/O bus.

In this particular example, the microprocessor will want to "send" data (write) to the USART for transmission to the data communications line to continue the transfer of data to a remote terminal.

Thus, the microprocessor 600 can interrogate (READ) the component requestor (CRID) of the Line Adapter to determine which component requires service (i.e., USART, program timer 1 or program timer 2). All of these can be individually addressed and "read" out.

Other Functions: The microprocessor can interrogate the adapter type ID which connects a set of jumpers which can inform of the "type" of adapter and type of protocol requirements it has. The microprocessor can also interrogate data in the automatic calling status register.

Interface Operation (Data-Comm Line-Adapter/State Machine)

The UIO Data-Communication Line-Adapter is an application dependent device which is controlled by the UIO State Machine Processor 600. Two basic types of Line Adapters are available—these are the "Character/Byte Oriented" Line Adapter and the "Bit Oriented" Line Adapter, each of which may have a variety of electrical interfaces to the data communication lines.

One to eight Line Adapters may be serviced by one State Machine Processor on an individual basis. Each Line Adapter contains components which are addressable and are serviced by the State Machine Processor with PUT or GET instructions. The components on the Line Adapter are serviced with one or a series of instructions which, in some cases, provide sequential control of the component. The "communication" between the State Machine Processor and the Line Adapter can be separated into two basic groups:

(i) Undesignated
(ii) Designated

The "Undesignated" operations do not require the Line Adapter to be designated to execute those instructions. "Designated" type operations require the Line Adapter to be designated or "identified" to execute those instructions or series of instructions.

The following operations (except for ACUOR) in addition to requiring the Line Adapter to be "Designated" will use the First Control Register 37 in the State Machine Processor 600 for control purposes to components on a Line Adapter. With the exception of the Clear OP, all other operations will be a series of PUT/GET OPs to provide the necessary sequential control.

"Data" outputted to the Line Adapter for these operations will originate from the Second Output Control Register 38 of the State Machine in FIG. 3.

The bits of the First Output Control Register 37 of the State Machine (FIG. 3) are organized for control functions as follows:

TABLE Y-6

| | | (Output Control Register Bits for First Control Register 37) |
|---|---|---|
| Bit | Signal | |
| 0 | UCS | USART Chip Select - This bit must be a "1" when the USART requires a chip |

TABLE Y-6-continued (Output Control Register Bits for First Control Register 37)

| Bit | Signal | |
|---|---|---|
| 1 | TCS | Timer Chip Select - This bit must be a "1" when the Program Timer/Baud Rate Generator requires a chip select. |
| 2 | IACKI | Interrupt Acknowledge In - This bit must be a "0" to acknowledge an interrupt from a designated and chip selected USART. |
| 3 | WE | Write Enable - This bit must be "0" to enable writing to the USART or Timer. |
| 4 | RE | Read Enable - This bit must be "0" to enable reading from the USART or Timer. |
| 5,6 | A0, A1 | Address Bit 0 or 1 - These two bits select a register within the Timer. |
| 7 | CLR | Clear - This bit must be "1" to provide a clear to the Line Adapter. |

Read and Write Systems Procedures for USART

Regarding paragraphs (i) Read and (ii) Write just discussed above, the USART Read procedure is used when reading the USART data registers, status registers or control registers discussed previously under the topic of "USART Organization and Operation".

Thus, in the (i) Read procedure, the following series of operations occur:

| | OP | V-FLD | D-FLD | DATA (Hex Code) |
|---|---|---|---|---|
| (ia) | PUT | 01110 | X001 | kk |

Here, the second output control register 38 of the State Machine Processor 600 (FIG. 3) is strobed by Strobe 190 2 signal to load it with the register-address of the USART. Also kk=the address of the USART register to be read as per Table Y-7, shown hereinafter below.

| | OP | V-FLD | D-FLD | DATA (Hex Code) |
|---|---|---|---|---|
| (ib) | PUT | 01101 | X001 | ID |

Here, the first control register 37 (FIG. 3) is strobed by Strobe #2 to signal a USART Chip Select (pointer to selected USART).

| | OP | V-FLD | D-FLD | DATA (Hex Code) |
|---|---|---|---|---|
| (ic) | PUT | 01101 | X001 | OD |

Here, upon the occurrence of Strobe #2, the first output control register 37 will initiate the RE (read enable) signal.

| | OP | V-FLD | D-FLD | DATA (Hex Code) |
|---|---|---|---|---|
| (id) | GET | 11101 | — | FFnn |

(where FF represents the "upper" 8 bits of I/O bus 10), where nn indicates the lower 8 bits of I/O bus 10).

This OP gets the data read out from the selected register and onto the I/O bus 10, FIG. 2, (via the Data Access Line, DAL, bus-controller 503 and MUX 504), and where nn=the data (read-out) on the least significant 8-bits of the I/O bus 10.

| | OP | V-FLD | D-FLD | DATA (Hex Code) |
|---|---|---|---|---|
| (ie) | PUT | 01101 | X001 | IC |

This OP takes the control signal from the first register 37, during Strobe #2, in order to remove (disconnect) the chip select of the USART just read.

The address (kk) of the various USART registers to be "read" is shown in Table Y-7 below.

TABLE Y-7

| Address | USART Register |
|---|---|
| 06 (=110) | Receive Holding Register |
| 04 (=100) | Status Register |
| 02 (=010) | USART Control Register #2 |
| 00 (=000) | USART Control Register #1 |

Now, when it is required to "write" into a designated register of a selected USART, the following (ii) WRITE procedure is used:

| | OP | V-FLD | D-FLD | Data (Hex code) |
|---|---|---|---|---|
| (ii-a) | PUT | 01110 | X001 | k'k' |

Here, when Strobe #2 strobes the second output control register 38 (FIG. 3), then the USART register address k'k' will be loaded with the USART address.

Here, k'k' = the address of the USART register to be written into as per Table Y-8.

| | OP | V-FLD | D-FLD | Data (Hex code) |
|---|---|---|---|---|
| (ii-b) | PUT | 01101 | X001 | ID |

Here, Strobe #2 will strobe the first output control register 37 (FIG. 3) to chip select the desired USART.

| | OP | V-FLD | D-FLD | Data (Hex code) |
|---|---|---|---|---|
| (ii-c) | PUT | 01110 | X001 | nn |

Here, Strobe #2 will strobe data into the second output control register 38 (FIG. 3) which data (WRITE DATA) is later destined for the addressed register of the selected USART.

| | OP | V-FLD | D-FLD | Data (Hex code) |
|---|---|---|---|---|
| (ii-d) | PUT | 01101 | X001 | 15 |

Here, when Strobe #2 occurs, then the first output control register 37 (FIG. 3) provides a Write Enable ($\overline{WE}$) signal to the selected USART so that data from 2nd OC register 38 will be written into the addressed register of the selected USART.

| | OP | V-FLD | D-FLD | Data (Hex code) |
|---|---|---|---|---|
| (ii-e) | PUT | 01101 | X001 | IC |

Here, upon occurrence of Strobe #2, then first OC register 37 will continue the Write Data cycle for one extra clock for data to be written into the addressed register, after Chip Select and Write Enable are turned off.

The address k'k' of the USART registers to be "written into" are shown in Table Y-8 below:

TABLE Y-8

| Address | USART Register to be written into |
|---------|-----------------------------------|
| 06 | Transmit Holding Register |
| 04 | SYN/DLE Register |
| 02 | Control Register #2 |
| 00 | Control Register #1 |

USART Interfacing:

Three procedures are used when communicating with a USART on a Line Adapter; these are:
(i) Read Procedure
(ii) Write Procedure
(iii) Interrupt Acknowledge Procedure
Timer/Baud Rate Generator Interfacing:

Two basic procedures are used when communicating with the timer components; these are: (i) Write Procedure and (ii) Read Procedure.

Five control signals originating from unique bits of the First Output Control Register 37 are used for the Timer. These are:
TCS—Timer Chip Select
A0, A1—Register Addressing Lines
WE—Write Enable
RE—Read Enable
Baud Rate Generator:

The "character" oriented UIO Data Comm Line Adapters will use a USART which requires an input clock that is 32 times faster than the bit-time of the Asynchronous line it is communicating with. To obtain this X32 clock it is preferred to use an Intel 8253 programmable timer chip, whose squarewave output is connected to the USART. This timer is driven by a crystal controlled clock whose frequency is 1.2288 megahertz. After initializing the Timer, a divisor value must be loaded which will produce the necessary X32 clock.

Read-Write: Selected Timer-Registers

In order to "write" into any of the timer registers (residing in 507, 509, 511, 514 of FIG. 2) a timer-write procedure (tw) is used as follows, where:
k=1 is the Program Timer #1 address
k=3 is the Program Timer #2 address
k=5 is the Baud Rate Generator Data field address
k=7 is the mode word address

| | OP | V-FLD | D-FLD | Data (Hex Code) |
|---|----|----|----|----|
| (tw-1) | PUT | 01101 | X001 | kE |

Here, the PUT OP will put selection and mode data in the first output control register 37 (FIG. 3) which will chip select the desired timer register ($A_0 A_1$) per value of "k".

| (tw-2) | PUT | 01101 | X001 | k6 |
|---|---|---|---|---|

Here, the PUT OP (an occurrence of Strobe #2) will turn on the "Write Enable" lines for permitting data transfer to the selected register of the selected timer.

| | OP | V-FLD | D-FLD | Data (Hex Code) |
|---|----|----|----|----|
| (tw-3) | PUT | 0110 | X001 | nn |

Here, the PUT OP (on occurrence of Strobe #2) will transfer data residing in Second Output Control Register 38 (FIG. 3) to the selected register of the selected timer.

| (tw-4) | PUT | 01110 | X001 | $\overline{nn}$ |
|---|---|---|---|---|

Here, Strobe #2 enables Second Output Control Register 38 (FIG. 3) to write (transfer) data as in (tw-3), thus permitting two clock periods for "write".

| (tw-5) | PUT | 01101 | X001 | kE |
|---|---|---|---|---|

Here, on Strobe #2, the PUT OP will select the First Output-Control Register 37, and turn off $\overline{WE}$.

| (tw-6) | PUT | 01101 | X001 | 1C |
|---|---|---|---|---|

Here, on Strobe #2 the PUT OP will take control data from First Register 37 (FIG. 3) to turn off the timer chip select, and turn off the address of the selected timer register.

When it is desired to "read" out data from either Program Timer #1 or #2, then the "Read-Procedure" for timer-read (tr) is used as follows, where:
k=1 represents the Program Timer #1 data field address value
k=3 represents Program Timer #2 data field value
(k−1)=0 represents Program Timer #1 data field address value and $\overline{RE}$ (read enable—on)
k=2 represents Program Timer #2 data field address value and $\overline{RE}$ (read enable-on).

| | OP | V-FLD | D-FLD | Data (Hex Code) |
|---|----|----|----|----|
| (tr-1) | PUT | 01101 | X001 | kE |

Here, on Strobe #2 the PUT OP will load First Register 37 with bits to address-select a timer-register ($A_0$, $A_1$—bits 5, 6) and to Chip Select a Timer (bit 1 of Table Y-6).

| (tr-2) | PUT | 01101 | X001 | (k-1) | E |
|---|---|---|---|---|---|

Here, First Register 37 (FIG. 3) is Read-Enabled so that data from Timer register can be read-out.
(tr-3) Exactly the same as (tr-2). This gives extra time to place data from the selected timer-register onto the I/O bus 10.

| (tr-4) | GET | 11101 | — | $\overline{nn}$ |
|---|---|---|---|---|

Here, the GET OP takes the read-out data (from the selected timer-register) which is on the I/O bus 10 (FIG. 2) and puts it into the State Machine microprocessor. The data is in "inverted" form ($=\overline{nn}$).

| | | | | |
|---|---|---|---|---|
| (tr-5) | PUT | 01101 | X001 | kE |

Here, the PUT OP (on Strobe #2) will turn-off the RE (read-enable) in the First Register 37.

| | | | | |
|---|---|---|---|---|
| (tr-6) | PUT | 01101 | X001 | IC |

This PUT OP (on Strobe #2) will set bit 1 of First Register 37 to "0" to turn off the Timer Chip Select control signal, to remove the pointer.

The above described line adapter organization involves an architecture where one microprocessor can be used to handle up to eight separate line adapters and wherein each of the line adapters may have three components therein (USART and program timer 1, program timer 2). Each of these three components have a capability of "requesting" service which thus leads to the total capability of 24 separate units which are capable of requesting service from the microprocessor 600. These components may thus receive instructions and programs.

Additionally, there are several other components associated with each line adapter which may be interrogated by the processor and read out for use of the microprocessor in getting certain operating information. These are the adapter identification, which is an encoded signal set by settable jumpers which identify the particular type of adapter involved and the type of protocol required, and also there is the automatic calling unit status signal data which can be interrogated in order to find out the state of any dialing mechanism for the telephone line which is being used to transfer/receive data between a remote terminal and a line adapter. Thus, there are at least six items of data for each line adapter which can be read out by the microprocessor. These are: the USART, Program Timer 1, Program Timer 2, the ACU-Status, the Adapter ID, and Component Requestor ID (FIG. 11). Assuming a system using eight line adapters, this gives a total of 48 elements which can be read out and garnered for data to be supplied to the microprocessor 600.

There has been herein described a data communication system for use in communicating to remote terminals where a multiple line adapter organization is controlled by a single microprocessor and wherein the internal communications are handled through multiple groups of multiplexors which can be selected in order to allow the reading out of data for the microprocessor which can then formulate its subsequent instructions for service to particular line adapters.

Additionally, the microprocessor 600 can access components in the line adapters and "write" into them programs and instructions for enabling the execution of data transfers between remote terminals and the microprocessor which connects to a host computer.

What is claimed is:

1. In a data-comm subsystem wherein a line support processor controls data transfer operations between a host computer and line adapters connected to remote terminals, and said line support processor includes a microprocessor means and said plurality of line adapters where each line adapter has addressable USART registers and Timer registers, and said microprocessor means includes an I/O bus means having discrete bit-lines connected to said line adapters via a multiplexor means and includes first and second output control registers connected to said line adapters via a bus-controller transceiver means and data bus means, a Read/Write system for communicating with selected ones of said USART and Timer registers, the combination comprising:

(a) said microprocessor means for executing data transfer instructions from said host computer and including:
  (a1) a microprocessor for generating (i) address data for selecting one of said USART or Timer registers, and (ii) control data to select a particular line adapter and an associated particular group of multiplexors from said multiplexor means, and including:
    (a1a) means to read data from or to write data into a selected one of said USART or Timer registers in said selected line adapter;
    (a1b) said first and second output control registers for holding said control data and said address data for conveyance to said line adapters and to said multiplexor means;
  (a2) said I/O bus means having a plurality of discrete bit-lines for conveying data from each multiplexor of said selected associated particular group of multiplexors, to said microprocessor, said I/O bus means including:
    (a2a) a first series of connection means for carrying a service request signal from each one of said line adapters via a gating means to separate bit lines of said I/O bus means for conveyance to said microprocessor;
    (a2b) a second series of connection means for carrying output signals from said each multiplexor of said selected associated particular group of multiplexors along each separate bit line of said plurality of bit lines;
(b) said plurality of line adapters each connected for data transfer to/from a remote data terminal and connected for data transfers from said microprocessor via said bus controller-transceiver means, and connected for data transfers from a selected line adapter to said microprocessor via said bus controller-transceiver means and said selected associated particular group of multiplexors by way of said I/O bus means, and wherein each of said line adapters includes:
  (b1) a plurality of said Timer-registers for receiving and holding data for regulating the time sequence of data transfer operations to/from said remote data terminal;
  (b2) a plurality of said USART registers for receiving and holding data to control data transfer operations to/from said selected line adapter;
  (b3) means for generating said service request signal to said microprocessor via an said associated gating means;
  (b4) means for activating an identifier input to said associated group of multiplexors to identify to said microprocessor which line adapter is requesting service and which Timer or USART register in that line adapter is to be written into or read from by said microprocessor;
(c) said multiplexor means forming said plurality of groups of multiplexors wherein each said group is associated with each one of said line adapters for receiving output data from said selected line adapter for conveyance to said microprocessor, and wherein said multiplexor means includes:
- (c1) said data bus means from said selected line adapter for conveying line-adapter output data via said bus-controller transceiver to said selected associated group of multiplexors;
- (c2) a plurality of data input means for each group of said multiplexors including:
  - (c2a) an identifier input to identify the functional type of its said associated line adapter;
  - (c2b) an input from said gating means to indicate whether a said USART register or Timer register, of the said associated line adapter, is requesting service of said microprocessor;
- (d) line adapter selection means for selecting a line adapter and its said associated group of multiplexors and its associated gating means, said selection means including:
  - (d1) designate logic means activated by said microprocessor means for selecting a particular line adapter and for enabling said selected associated group of multiplexors;
  - (d2) component select logic means for selecting said Timer registers or said USART registers in said selected line adapter for enabling said address data from said microprocessor to select a particular register;
- (e) said bus controller-transceiver means connected to receive said control and address data from said microprocessor for conveyance to said line adapters and including:
  - (e1) means to receive data from said selected line adapter for transfer to said selected associated group of multiplexors;
- (f) said plurality of gating means wherein each one of said gating means is associated with each one of said line adapters and functions to generate said service request signal to said microprocessor for the particular line adapter needing service;
- (g) said host computer connected to said microprocessor and initiating data transfer commands to said microprocessor means.

2. The system of claim 1 which includes:
- (a) a plurality of automatic calling unit-output registers wherein each one of said line adapters is provided with a dedicated automatic calling unit-output register for receiving dialing data from said microprocessor, usable for dialing telephone line connections for said associated line adapter;
- (b) an automatic calling unit for receiving dialing data from said dedicated automatic calling unit-output register and for establishing a telephone line connection from the said associated line adapter to a said remote data terminal.

3. In a data-comm subsystem wherein a line support processor controls data transfer operations between a host computer and remote data terminals, and said line support processor includes a plurality of line adapters, a multiplexor means and a microprocessor, said microprocessor providing for transfer of first write-in and second read-out control-information data plus third write-in and fourth read-out data from/to said line adapters, and having an I/O bus means, a Read-Write system for communicating with said line adapters, the combination comprising:
- (a) a plurality of said line adapters, operatively controlled by said microprocessor, and wherein each line adapter includes:
  - (a1) programmable USART control component means for transmission of or reception of data between a remote terminal and said microprocessor, said USART means including a plurality of component control registers holding said first write-in data and second read-out control-information data;
  - (a2) programmable timing means for setting baud rate of data transfers and for protocol timing signals, said timing means including a plurality of timing control registers holding said third write-in and said fourth read-out control-information data;
  - (a3) gating means, connected to said USART control component means and said timing means for generating control signals to a designate logic means and to said multiplexor means and for signaling said microprocessor for service, and for activating a discrete bit line of said I/O bus means;
  - (a4) said designate logic means, receiving said control signals from said gating means and said control data from said microprocessor, for selecting a particular line adapter and a particular USART or Timer register in said USART means or said timing means;
- (b) said microprocessor operating to identify a USART component or timing register requiring service by scanning for an activated bit line of said I/O bus, and for generating control-signals to said line adapters, to said multiplexors means and said USART and timing registers, and said designate-logic means, said microprocessor including:
  - (b1) means for identifying a particular line adapter requesting service or a line adapter to be given data transfer instruction;
  - (b2) means for selecting a group of multiplexors from said multiplexors means associated with said particular line adapter;
  - (b3) means for addressing a selected one of said USART or timing registers for enabling read-out of said second control-information data from or write-in of said first control-information data into said selected register;
  - (b4) means for selecting which one of a plurality of input signals, to each one of said multiplexors in said selected grop of multiplexors, will be selected for read-out by said microprocessor;
  - (b5) means for generating said first control-information data for write-in to a selected said USART or timing register;
- (c) bus transceiver means, controlled by said microprocessor, for routing said control data from said microprocessor to a selected line adapter, or for routing said information data from a selected line adapter or one of a selected group of said multiplexors to enable read out of said information data to said microprocessor from said selected line adapter;
- (d) said multiplexor means for receiving said information data from a selected line adapter, via said bus transceiver means, for transmittal to said microprocessor, said multiplexor means including:
  - (d1) a plurality of said groups of multiplexors wherein each group of "m" multiplexors is associated with each line adapter and each output of each multiplexor of said group of "m" multiplexors is connected to a separate bit line of said I/O bus means, where "m" represents the number of bit lines which can parallel-transfer a byte of data;
  - (d2) a plurality of input data line signals for each of said group of multiplexors including:

(d2a) said second control-information data from said selected USART or timing register;

(d2b) adapter functional-type data from a manually set jumper-code unit;

(d2c) said control signals from said gating means for identifying a particular one of said USART or timer registers;

(d2d) said control data from said microprocessor for selecting said associated group of multiplexors for selecting which one of said input data line signals is to be selected for transmittal to said microprocessor;

(d3) a plurality of output data lines connected to said I/O bus means wherein each multiplexor in said group of "m" multiplexors provides one of said output data lines to a separate bit line of said I/O bus means;

(e) said I/O bus means connecting each of said plurality of groups of multiplexors to said microprocessor, and said I/O bus means including:

(e1) an I/O bus having a plurality of separate bit lines connecting said output data lines of said multiplexors to said microprocessor;

(f) a jumper-code unit, for each said group of multiplexors, and including:

(f1) a manually set group of electrical jumper terminals for setting a data code to identify the functional-type of each line adapter in said plurality of line adapters.

* * * * *

UNITED STATES PATENT AND TRADEMARK OFFICE
CERTIFICATE OF CORRECTION

PATENT NO.  : 4,630,232
DATED       : December 16, 1986
INVENTOR(S) : Richard A. Loskorn and Lyle O. Jevons, Jr.

It is certified that error appears in the above-identified patent and that said Letters Patent is hereby corrected as shown below:

```
Col.  6, line 33, change "ine" to --Line--.
Col. 11, line 20, change "Acces" to --Access--;
         line 55, change "0111" to --01111--.
Col. 13, line 61, change "repesent" to --represent--.
Col. 23, line 38, delete "190";
                  change "2" to --#2--;
         line 61, change "10)," to --10,--.
Col. 28, line 57, delete "an".
Col. 30, line 44, change "grop" to --group--.
```

Signed and Sealed this

Thirty-first Day of March, 1987

Attest:

DONALD J. QUIGG

Attesting Officer

Commissioner of Patents and Trademarks